United States Patent
Krauss et al.

(10) Patent No.: US 10,047,443 B2
(45) Date of Patent: Aug. 14, 2018

(54) METHODS FOR PRODUCING HYDROGEN USING NANOPARTICLE-CATALYST MIXTURES

(71) Applicants: Todd Krauss, Pittsford, NY (US); Kara L. Bren, Rochester, NY (US)

(72) Inventors: Todd Krauss, Pittsford, NY (US); Kara L. Bren, Rochester, NY (US)

(73) Assignee: University of Rochester, Rochester, NY (US)

(*) Notice: Subject to any disclaimer, the term of this patent is extended or adjusted under 35 U.S.C. 154(b) by 339 days.

(21) Appl. No.: 14/606,784

(22) Filed: Jan. 27, 2015

(65) Prior Publication Data
US 2016/0024664 A1    Jan. 28, 2016

Related U.S. Application Data

(60) Provisional application No. 61/932,430, filed on Jan. 28, 2014.

(51) Int. Cl.
| | | |
|---|---|---|
| B01J 23/00 | (2006.01) | |
| C25B 1/00 | (2006.01) | |
| C25B 1/02 | (2006.01) | |
| B01J 23/755 | (2006.01) | |

(52) U.S. Cl.
CPC .............. C25B 1/003 (2013.01); B01J 23/755 (2013.01); C25B 1/02 (2013.01); *C01B 2203/1058* (2013.01)

(58) Field of Classification Search
CPC ........ C01G 11/00; C01G 11/02; C01G 20/00; C01G 20/21; C01G 15/00; C01G 17/00; C01B 33/02; Y10S 420/90
See application file for complete search history.

(56) References Cited

U.S. PATENT DOCUMENTS

| | | | | |
|---|---|---|---|---|
| 8,188,005 B2* | 5/2012 | Choi | ................. | C05D 9/02 502/102 |
| 2006/0116282 A1* | 6/2006 | Honda | ................. | C01B 13/18 502/129 |

OTHER PUBLICATIONS

Han, Zhiji, et al. "Robust photogeneration of H2 in water using semiconductor nanocrystals and a nickel catalyst." Science 338. 6112 (2012): 1321-1324.*
Gur, I.; Fromer, N. A.; Geier, M. L.; Alivisatos, A. P. Air-Stable All-Inorganic Nanocrystal Solar Cells Processed from Solution Science 2005, 310, 462-464.*
Kwak, Woo-Chul, et al. "Tuning the energy bandgap of CdSe nanocrystals via Mg doping." Nanotechnology 18.20 (2007): 205702.*
Li, Zhi-Jun, et al. "An exceptional artificial photocatalyst, Nih-CdSe/CdS Core/Shell hybrid, made in situ from CdSe quantum dots and nickel salts for efficient hydrogen evolution." Advanced Materials 25.45 (2013): 6613-6618.*
Shen, Liming, et al. "*Escherichia coli* bacteria-templated synthesis of nanoporous cadmium sulfide hollow microrods for efficient photocatalytic hydrogen production." The Journal of Physical Chemistry C 114.6 (2010): 2551-2559.*

(Continued)

*Primary Examiner* — Richard M Rump
(74) *Attorney, Agent, or Firm* — Harris Beach PLLC

(57) ABSTRACT

Methods for producing hydrogen using nanoparticles, a catalyst, and a source of electrons, such as bacteria and their nutrient source in a biological system, are carried out in an aqueous medium. The nanoparticles may be doped with a plurality of isovalent and/or non-isovalent dopants.

12 Claims, 24 Drawing Sheets

(56) References Cited

OTHER PUBLICATIONS

Han, Z. et al., "Robust Photogeneration of H-2 in Water Using Semiconductor Nanocrystals and a Nickel Catalyst," 2012 Science, vol. 338, Issue 6112 (pp. 1321-1324).
Strik, D. et al.,"Microbial Solar Cells: Applying Photosynthetic and Electrochemically Active Organisms," 2011 Trends in Biotechnology, vol. 29, No. 1 (pp. 41-49).
Qian, F. et al., "Solar-Driven Microbial Photoelectrochemical Cells With a Nanowire Photocathode," 2010 Nano Letters 10 (pp. 4686-4691).
Torella, J. et al.,"Efficient Solar-To-Fuels Production From a Hybrid Microbial-Water-Splitting Catalyst System," 2015 Proc. Natl. Acad. Sci., vol. 112, No. 8 (pp. 2337-2342).
Wan, L. et al., "A Solar Assisted Microbial Electrolysis Cell for Hydrogen Production Driven by a Microbial Fuel Cell," 2015 Rsc. Adv. 5 (pp. 82276-82281).
Sakimoto, K. et al., "Self-Photosensitization of Non-Photosynthetic Bacteria for Solar-To-Chemical Production," 2016 Science, vol. 351, Issue 6268 (pp. 74-77).
Dumas, E. et al., "Interfacial Charge Transfer Bwteeen CdTe Quantum Dots and Gram Negative Vs Gram Positive Bacteria," 2010 Environ. Sci. & Technol. 44 (pp. 1464-1470).
Wang, Z. et al., "Effects of Soluble Flavin on Heterogeneous Electron Transfer Between Surface-Exposed Bacterial Cytochromes and Iron Oxides," 2015 Geochimica et Cosmochimica Acta 163 (pp. 299-310).
Kotloski, N. et al., "Flavin Electron Shuttles Dominate Extracellular Electron Transfer by Shewanella Oneidensis," 2013 mBio, vol. 4, No. 1 (pp. 1-4).
Rabaey, K. et al., "Microbial Fuel Cells: Novel Biotechnology for Energy Generation," 2005 Trends in Biotechnology, vol. 23, No. 6 (pp. 291-298).
Lee, Hyung-Sool et al., "Biological Hydrogen Production: Prospects and Challenges," 2010 Trends in Biotechnology, vol. 28, No. 5 (pp. 262-271).
Selembo, P. et al., "Hydrogen Production With Nickel Powder Cathode Catalysts in Microbial Electrolysis Cells," 2010 International Journal of Hydrogen Energy 35 (pp. 428-437).
Cheng, S. et al., "Sustainable and Efficient Biohydrogen Production via Electrohydrogenesis," 2007 Proc. Natl. Acad. Sci., vol. 104, No. 47 (pp. 18871-18873).
Patil, S. et al., "Improved Microbial Electrocatalysis With Osmium Polymer Modified Electrodes," 2012 Chem. Commun. 48 (pp. 10183-10185).
Yong, Yang-Chun et al., "Highly Active Bidirectional Electron Transfer by a Self-Assembled Electroactive Reduced-Graphene-Oxide-Hybridized Biofilm," 2014 Angew. Chem. Int. Ed. Engl. 53 (pp. 4480-4483).
Wei, J. et al., "Recent Progress in Electrodes for Microbial Fuel Cells," 2011 Bioresource Technology 102 (pp. 9335-9344).
Bretschger, O. et al., "Current Production and Metal Oxide Reduction by Shewanella Oneidensis Mr-1 Wild Type and Mutants," 2007 Appl. Environ. Microbiol., vol. 73, No. 21 (pp. 7003-7012).
Yang, Y. et al., "Bacterial Extracellular Electron Transfer in Bioelectrochemical Systems," 2012 Process Biochemistry 47 (pp. 1707-1714).

* cited by examiner

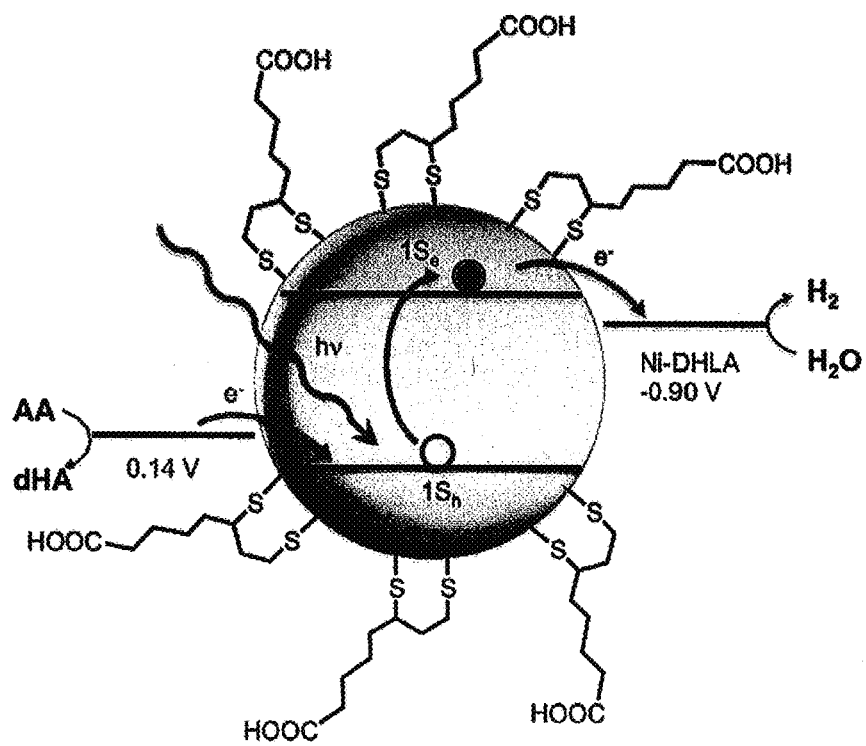
FIG. 1
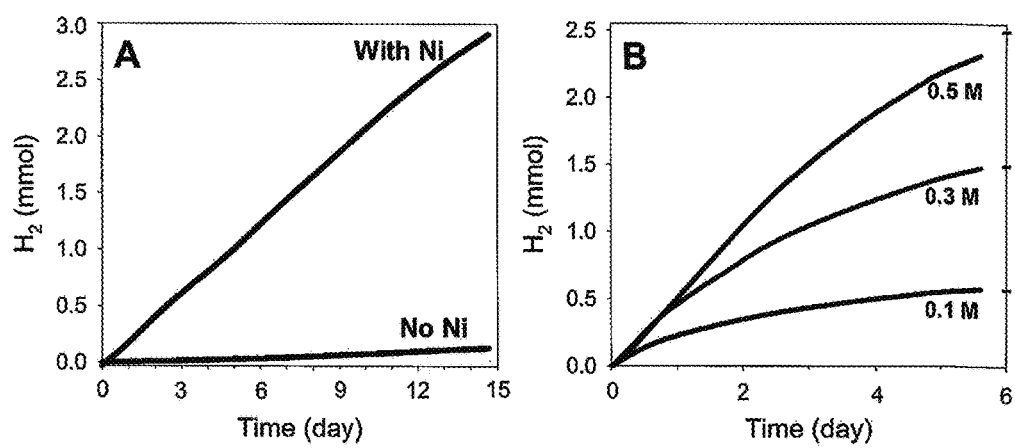
FIGS. 2A-B

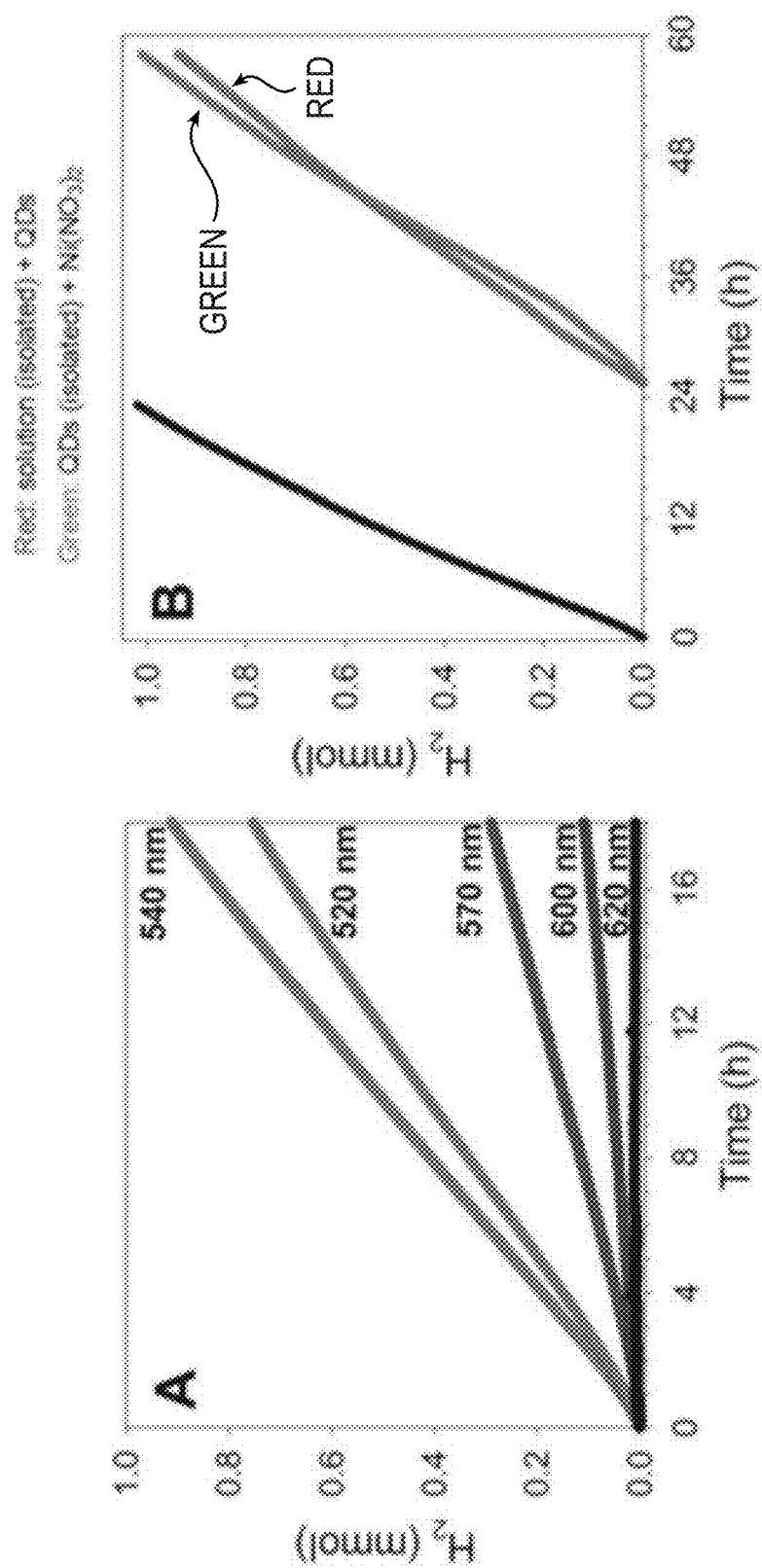
FIG. 3A-B

FIG. 11A-B

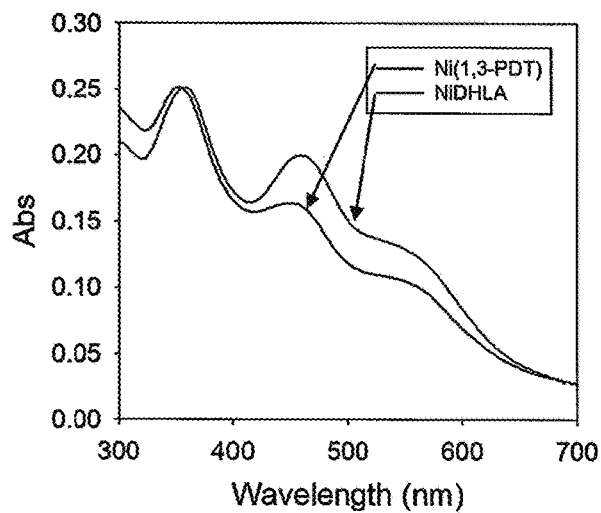
FIG. 15
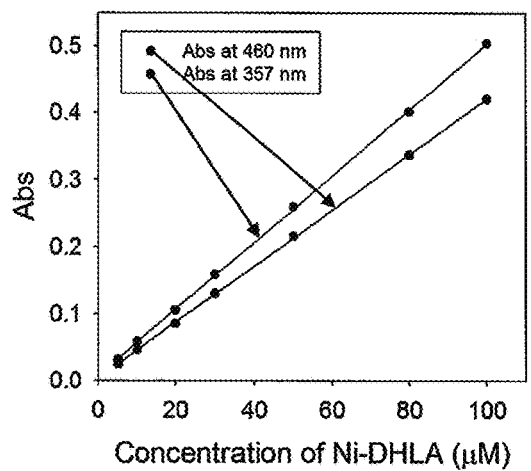
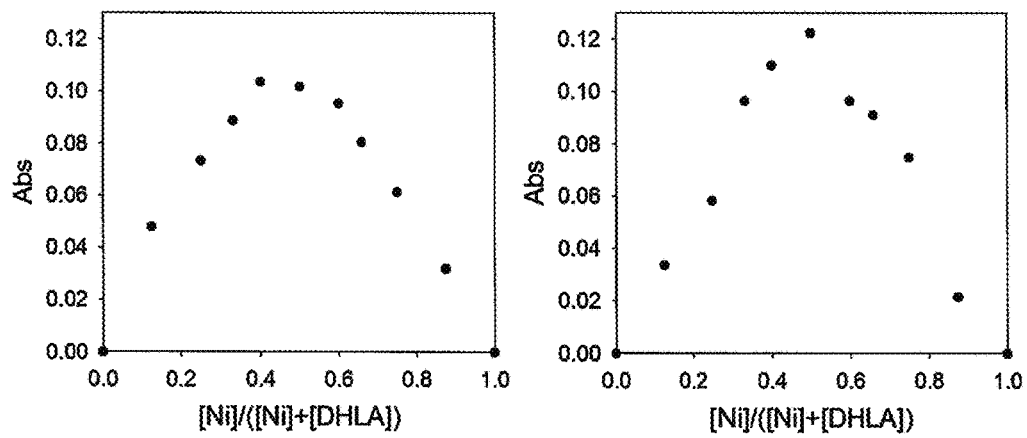
FIG. 16

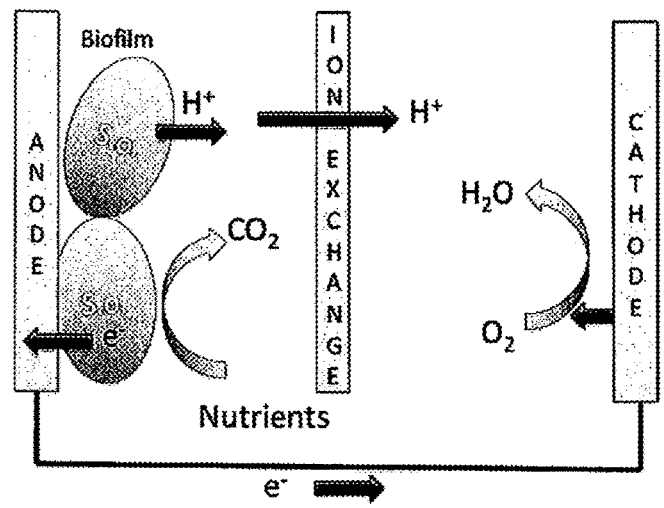
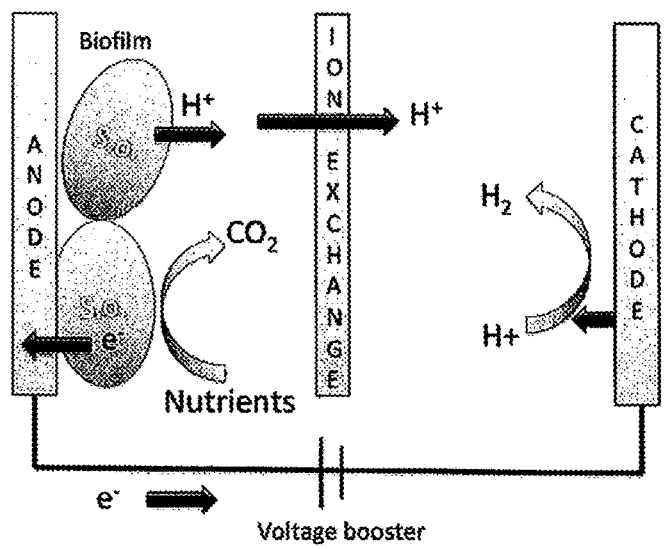
FIGS. 26A-B

FIGS. 28A-C

METHODS FOR PRODUCING HYDROGEN USING NANOPARTICLE-CATALYST MIXTURES

CROSS-REFERENCE TO RELATED APPLICATIONS

This application claims priority to and the benefit of U.S. provisional patent application Ser. No. 61/932,430, entitled Methods For Producing Hydrogen Using Nanoparticle-Catalyst Mixtures, filed Jan. 28, 2014, which is incorporated herein by reference in its entirety.

STATEMENT REGARDING FEDERALLY SPONSORED RESEARCH OR DEVELOPMENT

The disclosed invention was made with government support under contract no. N00014-13-1-0782 from the Office of Naval Research. The government has rights in this invention.

1. TECHNICAL FIELD

The present invention generally relates to production of hydrogen (i.e., $H_2$). More particularly, the invention relates to methods for producing hydrogen using nanoparticles and metal catalysts.

2. BACKGROUND

One challenge facing the world is the harvesting, production, and distribution of energy to support economic prosperity with responsible environmental stewardship. For example, in 2010, energy consumption in the U.S. was at a rate of 3 TW, of which 83% originated from fossil fuels. Thus, finding reliable and robust alternatives to petroleum-based fuels would enhance U.S. energy independence and energy security.

One way to mitigate the risks of relying on liquid fossil fuels is to develop alternative sources of energy, such as biofuels or synthetic fuels. One approach is the use of biofuels (i.e., biofuel mixed with ordinary petroleum-based fuel). However, the main drawback with the use of these fuels is the cost; biofuels can cost about 10 times as much as petroleum-based fuels. Currently, the synthesis of these new biofuels often involves the hydrogenation of animal or vegetable fats as a step in the production of liquid fuel. Long-term, however, a drawback to the widespread use of such biofuels is the cost to produce the hydrogen involved in the hydrogenation process. Hydrogen is typically produced through high-temperature steam reforming of hydrocarbons such as methane or liquid fuels. This process is energy intensive and also relies on natural gas, which is a fossil fuel, and thus the production of hydrogenated fuels will suffer to a great extent from the same risks as petroleum based fuels. Furthermore, a recent study concluded that the complete life-cycle process of biofuels synthesis actually increases greenhouse gas emissions.

The successful utilization of the clean energy carrier hydrogen ($H_2$) in the synthesis of biofuels, synthetic fuels (i.e., from syngas), or even as a fuel itself, requires methods for $H_2$ production using primary energy sources not based on fossil fuels. Of possible primary energy sources, solar offers the greatest long-term impact because of its abundance and availability, but many challenges need to be met for its utilization. For the direct conversion of sunlight to stored chemical energy in $H_2$, efficient photochemical reduction of protons in water is needed.

Molecular hydrogen can be produced from protons ($H^+$) in the reductive half-reaction of artificial photosynthesis (AP) systems. One of the strategies for light-driven proton reduction features a multicomponent solution with a light-absorbing molecule (chromophore) that transfers electrons to a catalyst that reduces protons. However, these solution systems often use nonaqueous solvents, and always have short lifetimes from decomposition of the chromophore over a period of hours. This difficulty has led to more complicated architectures that separate the sites of light absorption and proton reduction. Heterostructures between nanocrystals (NCs) and traditional precious metal nanoparticle $H_2$ production catalysts, and between NCs and iron-hydrogenases, have produced proton reduction in solution.

Research in artificial photosynthesis has been active since the 1970's. The energy storing reaction that is of greatest importance in artificial photosynthesis is the decomposition of water into its constituent elements, $H_2$ and $O_2$, with the former as the fuel. As a redox reaction, water splitting can be divided into its two half-cell components for separate investigation and development. Despite great efforts over the past decade, neither half-reaction has been carried out photochemically in a system composed of earth-abundant elements with both an activity and robustness of the type needed for further development. One approach for solar energy conversion relies on systems designed and built entirely on the molecular level, either to use light to achieve chemical potential in the form of charge separation, or as systems for solar fuel generation. Entirely molecular systems can present synthetic challenges, and molecular chromophores are prone to photodegradation. Reduced photosensitizers are unstable and rapidly photobleach, thus limiting the amount of $H_2$ potentially produced. Organic photosensitizers can store and therefore deliver only one electron at a time, while two are required for $H_2$ production. Thus, the turnover frequency for the overall catalytic processes is relatively slow, being dependent on diffusion of two photoexcited sensitizers to the catalyst. This second problem can be somewhat mitigated with a higher photon flux; however, a higher excitation rate exacerbates the photobleaching problem. Homogeneous systems for light-driven reduction of protons to $H_2$ typically suffer from short lifetimes because of decomposition of the light-absorbing molecule and/or catalyst, if present.

3. SUMMARY

A method is provided for producing hydrogen comprising:
(a) providing a source of electrons;
(b) contacting a nanoparticle or a plurality of nanoparticles and a metal complex catalyst in an aqueous medium to form a mixture in the presence of the source of electrons; and
(c) exposing the mixture from (b) to electromagnetic radiation having at least a wavelength in the absorption profile of the nanoparticle or the plurality of nanoparticles, wherein:
upon exposure to the electromagnetic radiation, the nanoparticle or the plurality of nanoparticles is capable of generating an electron that can reduce, in the presence of the catalyst, a proton in the aqueous medium, and
the source of electrons is capable of reducing the nanoparticle or the plurality of nanoparticles after reduction of the proton, such that hydrogen is produced.

In one embodiment of the method, the plurality of nanoparticles comprises at least two different types of nanoparticles.

In another embodiment of the method, the nanoparticle or plurality of nanoparticles is doped with a plurality of isovalent dopants and/or non-isovalent dopants.

In another embodiment of the method, the source of electrons is a biological system, e.g., bacteria and their nutrient source(s). The bacteria are the source for the nanoparticles, and the bacteria obtain the electrons from the growth medium.

In another embodiment of the method, the nanoparticle is selected from the group consisting of nanocrystals, quantum dots (QDs), magic size clusters (MSCs), quantum rods, dot-in-rod nanocrystals, quantum wires, dendridic inorganic nanostructures, tetrapods, cubes, core-shell nanoparticles, and alloy structures of any of the preceding.

In another embodiment of the method, the metal complex is a transition metal salt.

In another embodiment of the method, the transition metal salt is a $Ni^{2+}$ salt.

In another embodiment of the method, the source of electrons is a sacrificial electron donor and is present in the mixture.

In another embodiment of the method, the source of electrons is an external source of electrons.

In another embodiment of the method, the external source of electrons is a solar cell or an electrochemical bias.

In another embodiment of the method, the metal complex catalyst is generated in situ.

In another embodiment of the method, the aqueous medium is water.

A composition is provided for producing hydrogen comprising:
(a) a nanoparticle or a plurality of nanoparticles;
(b) a metal complex catalyst;
(c) a source of electrons; and
(d) an aqueous medium;
wherein:
the nanoparticle or the plurality of nanoparticles, the metal complex catalyst, and the aqueous medium are present as a mixture,
upon exposure to electromagnetic radiation having at least a wavelength in the absorption profile of the nanoparticle or the plurality of nanoparticles, the nanoparticle or the plurality of nanoparticles is capable of generating an electron that can reduce, in the presence of the metal complex catalyst, a proton in the aqueous medium, and
the source of electrons is capable of reducing the nanoparticle or the plurality of nanoparticles after reduction of the proton.

In one embodiment of the composition, the plurality of nanoparticles comprises at least two different types of nanoparticles.

In another embodiment of the composition, the nanoparticle is doped with a plurality of isovalent dopants and/or non-isovalent dopants.

In another embodiment of the composition, the source of electrons is a biological system, e.g., bacteria and their nutrient source(s). The bacteria are the source for the nanoparticles, and the bacteria obtain the electrons from the growth medium.

In another embodiment of the composition, the source of electrons is a sacrificial electron donor.

In another embodiment of the composition, the source of electrons is present in the mixture.

In another embodiment of the composition, the source of electrons is an external source of electrons.

In another embodiment of the composition, the external source of electrons is a solar cell or an electrochemical bias.

In another embodiment of the composition, the nanoparticles are selected from the group consisting of CdSe, CdS, CdTe, PbS, PbTe, PbSe, GaAs, InP, InAs, Si, and Ge nanoparticles.

In another embodiment of the composition, the nanoparticle is selected from the group consisting of nanocrystals, quantum dots (QDs), magic size clusters (MSCs), quantum rods, dot-in-rod nanocrystals, quantum wires, dendridic inorganic nanostructures, tetrapods, cubes, core-shell nanoparticles, and an alloy structure thereof.

In another embodiment of the composition, the metal complex is a transition metal salt.

In another embodiment of the composition, the transition metal salt is a $Ni^{2+}$ salt.

In another embodiment of the composition, the aqueous medium is water.

4. BRIEF DESCRIPTION OF THE DRAWINGS

Embodiments are described herein with reference to the accompanying drawings, in which similar reference characters denote similar elements throughout the several views. It is to be understood that in some instances, various aspects of the embodiments may be shown exaggerated, enlarged, exploded, or incomplete to facilitate an understanding of the invention.

FIG. 1. Energy diagram for $H_2$ production (Abbreviations: AA, ascorbic acid; dHA, dehydroascorbic acid). Potentials are shown versus normal hydrogen electrode (NHE) (pH=4.5). $1S_{e(h)}$ corresponds to the lowest excited electron (hole) state.

FIGS. 2A-B. (A) $H_2$ production over time from photolysis of an aqueous solution of 10.0 μM [Ni(NO$_3$)$_2$], 0.5 μM [NC(570)], and 1.0 M AA compared to an identical system without the nickel(II) additive. (B) Photolytic $H_2$ production with different initial concentrations of AA in a system containing 20.0 μM [Ni(NO$_3$)$_2$] and 1.0 μM [NC(570)]. The marks on the right axis indicate the theoretical maximum of $H_2$ production based on the amount of AA added. Photolysis experiments used a light-emitting diode (LED) source (λ=520 nm, 13 mW cm$^{-2}$) at 15° C. and 1 atm initial pressure of $N_2$:$CH_4$ (79:21 mole %) with $CH_4$ as an internal standard for $H_2$ quantification by GC analysis.

FIGS. 3A-B. (A) $H_2$ production from photolysis of aqueous solutions using different sizes of CdSe NCs (4.0 μM) labeled by their first excitonic absorption in nm, 4.0 μM [Ni(NO$_3$)$_2$], and 0.5 M AA. (B) When an active solution is filtered to separate the NCs from the solution nickel(II) catalyst, each component is inactive, but each component regains activity when the other is restored.

FIGS. 4A-B. Absorption spectra for (A) CdSe NCs in hexane and (B) DHLA-capped CdSe NCs in PBS buffer (pH 7.4).

FIG. 5. Photocatalytic hydrogen production from a system containing NC(540) (5.0 μM), Ni(NO$_3$)$_2$ (1.0 μM), AA (0.8 M) in $H_2O$ (5.0 mL) at pH 4.5 upon irradiation with 520 nm LED (13 mW/cm$^2$).

FIG. 6. Photocatalytic hydrogen production from systems containing NC(540) (4.0 μM), Ni(NO$_3$)$_2$ (4.0 μM), AA (0.5 M) in $H_2O$ (5.0 mL) at pH 4.5 (black) and in 1:1 EtOH/$H_2O$ (5.0 mL) at pH 5.0 (red) upon irradiation with 520 nm LED (13 mW/cm$^2$).

FIG. 7. Photocatalytic hydrogen production from a system containing NC(570) (4.0 μM), Ni(NO$_3$)$_2$ (4.0 μM), and AA (0.5 M) in H$_2$O (5.0 mL) at pH 4.5 upon irradiation with 520 nm LED (13 mW/cm$^2$). After all AA was depleted, 0.44 gram of AA was added to the system to bring the [AA] back to 0.5 M and the pH was adjusted to 4.5 for restarting the photolysis. The rate is lower upon restarting, possibly because (a) the capping ligand on NCs was oxidized after AA was depleted or (b) the system is sensitive to oxygen and AA addition under air caused some degradation.

FIG. 8. Absorption spectra of system containing NC(530) (3.8 μM), DQ$^{2+}$ (40 μM) in 1:1 EtOH/H$_2$O (3.0 mL) at pH 5.0 before irradiation, and after irradiation (λ>450 nm) for 5 min under N$_2$. The solution was then exposed to air (dotted). The difference of green and black spectra gives the absorption spectrum of the reduced DQ$^{2+}$ (30)

FIG. 9. Left: Photocatalytic hydrogen production from systems containing NC(520) (1.0 μM), AA (0.5 M) in H$_2$O (5.0 mL) at pH 4.5 upon irradiation with 520 nm LED (13 mW/cm$^2$) when [Ni(NO$_3$)$_2$] was 2.0 μM 4.0 μM, 8.0 μM, 20.0 μM; inset: the rate of H$_2$ production. Right: Photocatalytic hydrogen production from systems containing Ni(NO$_3$)$_2$ (20.0 μM), AA (0.5 M) in H$_2$O (5.0 mL) at pH 4.5 upon irradiation with 520 nm LED (13 mW/cm$^2$) when [NC(520)] was 1.0 μM, 2.0 μM, 4.0 μM; inset: the rate of H$_2$ production.

FIG. 10. Photocatalytic hydrogen production from systems containing NC(520) (3.8 μM), Ni(NO$_3$)$_2$ (20.0 μM), AA (0.5 M) in H$_2$O (5.0 mL) at pH 4.5 upon irradiation with 520 nm LED when light intensity was 13 mW/cm$^2$, 10 mW/cm$^2$, 7.1 mW/cm$^2$, 3.8 mW/cm$^2$; inset: the rate of hydrogen production.

FIGS. 11A-B. Brightfield TEM images of the NC(570) sample before (A) and after (B) one week of photolysis. Scale bar is 5 nm in (A) and 20 nm in (B). NC diameter as determined from TEM analysis was 3.7 nm, in agreement with the diameter expected from absorption spectroscopy (3.5 nm). After photolysis the NC size remains the same, but the NCs were significantly more agglomerated due to partial loss of the DHLA capping ligand.

FIG. 12. (Above) Energy dispersive X-ray spectrum from precipitated CdSe NCs after one week of photolysis. (Below) Percent of each element present in the sample according to the above spectrum. Note that the % Ni listed is an upper bound and that after photolysis the amount of Ni present is negligible.

FIG. 13. Photocatalytic hydrogen production from systems containing NC(540) (4.0 μM), AA (0.5 M) in H$_2$O (5.0 mL) at pH 4.5 upon irradiation with 520 nm LED (13 mW/cm$^2$ when catalyst is 4.0 μM [Ni(NO$_3$)$_2$], 4.0 μM [Ni(EDTA)] and 4.0 μM [colloidal Ni$^0$] (4 nm in diameter, concentration based on Ni atom).

FIG. 14. Cyclic voltammograms of a pre-mixed solution containing 0.4 mM Ni(NO$_3$)$_2$ and 1.2 mM DHLA in 1:1 EtOH/H$_2$O upon addition of 0.8 mM TFA, 1.6 mM TFA, 2.4 mM TFA, 3.2 mM TFA. Experiments used a glassy carbon working electrode, a Pt auxiliary electrode and a saturated calomel electrode (SCE) reference at a scan rate of 100 mV/s. Potentials were converted to normal hydrogen electrode (NHE).

FIG. 15. Absorption spectra of solutions containing 5.0× 10$^{-5}$ M Ni(NO$_3$)$_2$ with 0.2 M acetic acid/acetate buffer (pH 4.5 in H$_2$O) in 1:1 EtOH/H$_2$O when mixed with 2.5×10$^{-4}$ M DHLA, and 2.5×10$^{-4}$ M 1,3-PDT.

FIG. 16. Top: The absorption maxima of 1:1 Ni-DHLA complex in 1:1 EtOH/H$_2$O with 0.2 M acetic acid/acetate buffer (pH 4.5 in H$_2$O) increases linearly with [Ni-DHLA]. Bottom: Job plots (31) of Ni-DHLA complex (two separate trials) in 1:1 EtOH/H$_2$O with 0.2 M acetic acid/acetate buffer (pH 4.5 in H$_2$O).

FIG. 17. Photocatalytic hydrogen production from systems containing NC(570) (1.0 μM), Ni(NO$_3$)$_2$ (20.0 μM), AA (0.5 M) in H$_2$O (5.0 mL) upon irradiation with 520 nm LED (13 mW/cm$^2$), when pH was 2.2, 3.5, 4.5, 5.5.520 nm FIG. 18. Time dependence of $^{13}$C NMR spectra in solutions containing CdSe-DHLA NC(520) (4.0 μM), Ni(NO$_3$)$_2$ (4.0 μM), AA (0.3 M) in D$_2$O (5.0 mL) at pH 4.5 upon irradiation with 520 nm LED (13 mW/cm$^2$). Label for resonances are as follows: (A) ascorbic acid, (B) hydrate dehydroascorbic acid, (C) dihydrate dehydroascorbic acid.

FIG. 19. Hydrogen production from systems containing CdSe-DHLA, Ni(NO$_3$)$_2$ and ascorbic acid in H$_2$O at pH 4.5 upon irradiation with 520 nm light.

FIG. 20. Fluorescence of CdSe QDs with diameters increasing from ~2.5 nm (blue; right-most vial), to ~6.0 nm (red; left-most vial).

FIG. 21. Hydrogen production from systems containing CdSe-DHLA (0.5 μM), Ni(NO$_3$)$_2$ (10 μM) and ascorbic acid (1.0 M) in H$_2$O (5.0 mL) at pH 4.5 upon irradiation with 520 nm light.

FIG. 22. H$_2$ production from irradiation of aqueous solutions using different sizes of CdSe QDs labeled by the peak in their first excitonic absorption.

FIG. 23. Examples of catalysts that can be used for H$_2$ production with CdTe QDs.

FIG. 24. Absorption (top) and PL spectra (bottom) from intrinsic CdSe QDs (green), and CdSe QDs doped with ~1 (red) and ~6 (blue) Ag+ atoms per QD. Notice the increase in the dopant PL band at 650 nm with increasing doping level.

FIG. 25. Schematic representation of the electrocatalysis experimental setup with CdSe QDs. Electrons flow to the QD film surface where they reduce protons in the presence of DHLA.

FIGS. 26A-B. Bioelectrochemical systems. (A) Microbial fuel cell converting bacterial nutrients to current, (B) microbial electrolysis cell converting bacterial nutrients to a current to drive H$^+$ reduction. The cathode is typically Pt, and an external voltage needs to be applied. "S.o."=S. oneidensis bacteria, or other electrogenic bacteria.

FIG. 27. Components of the S. oneidensis metal-reducing (Mtr) system that engage in EET. NapC is an E. coli ortholog to S. oneidensis CymA; the other proteins shown are S. oneidensis proteins.

FIGS. 28A-C. Assemblies for light-driven bio-assisted H$_2$ production. (A) Combination of QDs and bacteria in solution. Feasible for H$_2$ production only if toxicity is low. EET may be direct or via a mediator (M/M$^-$). (B) Separation of QDs and bacteria with a porous membrane. (C) Use of QDs and bacteria in a photo-microbial electrochemical cell.

FIG. 29. Light-driven H$_2$ evolution by bio-nano systems. (A) H$_2$ evolution from a solution containing Shewanella oneidensis (0.02 OD at 600 nm at start of experiment) and DHLA-capped CdSe NCs in Luria-Bertani medium. Results are shown in the presence of Ni(NO$_3$)$_2$ (1 μM), and in the absence of Ni(NO$_3$)$_2$ (trace labeled Shewanella LB). The inset shows the change in OD at 600 nm for Shewanella oneidensis (0.02 OD at start of experiment) in Luria-Bertani medium. Data collected at 298 K.

5. DETAILED DESCRIPTION

Methods and materials are provided for photoinduced charge transfer and production of hydrogen (i.e., H$_2$). Provided is an advance in the realm of light-to-chemical energy conversion and artificial photosynthesis. Provided is a highly active and robust aqueous system for the photogeneration of hydrogen from water using nanoparticles (NPs), as a photosensitizer, a catalyst, and a source of electrons (e.g., a biological system).

A method is provided for producing hydrogen, comprising: (a) providing a source of electrons; (b) contacting a nanoparticle or a plurality of nanoparticles and a metal complex catalyst in an aqueous medium to form a mixture in the presence of the source of electrons; and (c) exposing the mixture from (b) to electromagnetic radiation having at least a wavelength in the absorption profile of the nanoparticle or the plurality of nanoparticles, wherein: upon exposure to the electromagnetic radiation, the nanoparticle or the plurality of nanoparticles is capable of generating an electron that can reduce, in the presence of the catalyst, a proton in the aqueous medium, and the source of electrons is capable of reducing the nanoparticle or the plurality of nanoparticles after reduction of the proton, such that hydrogen is produced.

FIG. 1 is a graphical depiction of one embodiment of the method. In the method, a combination of nanoparticles (NPs, also referred to interchangeably herein as nanocrystals and quantum dots (QDs)) or a mixture of nanoparticles (e.g., a plurality of nanoparticles comprising nanoparticles of at least two different types, such as nanoparticles of at least two different compositions or at least two different sizes), catalyst, and source of electrons in an aqueous medium is exposed to electromagnetic radiation (e.g., electromagnetic radiation in the solar region of the spectrum) resulting in the production of hydrogen.

In an embodiment, the method for producing hydrogen comprises a) contacting a nanoparticle (NP), a plurality of nanoparticles (NPs) or a mixture of nanoparticles (i.e., and a catalyst in the presence of a source of electrons in an aqueous solution; and b) exposing the mixture from a) to electromagnetic radiation, such that hydrogen is produced.

The nanoparticle is any nanoparticle that can absorb electromagnetic radiation and act as a photosensitizer. Without intending to be bound by any particular theory, it is considered that a photoexcited nanoparticle transfers an electron to the catalyst that then reduces a proton resulting in formation of hydrogen.

"Nanoparticle" (NP) as used herein includes nanocrystals, quantum dots (QDs), magic size clusters (MSCs), quantum rods, dot-in-rod nanocrystals, quantum wires, dendridic inorganic nanostructures, tetrapods, cubes, core-shell and alloy structures of any of the preceding, and the like. Nanoparticles also include any 3-D geometry whereby one or more dimensions are of such size to be considered quantum confined. For semiconductor materials, quantum confinement is based upon the inherent exciton Bohr radii of the constituent atoms. The nanocrystals include quantum dots such as, for example, cores, core-shells, alloyed cores, alloyed core-shells, and the like. Type I and Type II nanocrystals (e.g., Type II core-shell nanocrystals) can be used.

The nanoparticles can have a narrow size distribution. In an embodiment, a plurality of nanoparticles having a narrow size distribution (e.g., the nanoparticles are substantially monodisperse) is used. In an embodiment, the nanoparticles are substantially monodisperse. The term "substantially monodisperse" when describing nanoparticles denotes a population of nanoparticles of which a major portion, typically at least about 60%, in other embodiments from 75% to 90%, fall within a specified particle size range. A population of substantially monodisperse nanoparticles deviates 15% rms (root-mean-square) or less in diameter and typically less than 5% rms. In addition, upon exposure to a primary light source, a substantially monodisperse population of nanoparticles is capable of emitting energy in narrow spectral linewidths, as narrow as 12 nm to 60 nm full width of emissions at half maximum peak height (FWHM), and with a symmetric, nearly Gaussian line shape. The formulator will recognize, the linewidths are dependent on, among other things, the size heterogeneity (i.e., monodispersity) of the nanoparticles in each preparation.

The absorption profile and, thus, the reduction potential of the nanoparticles are determined, at least in part, by the size of the nanoparticles. A selected size (or size distribution) of nanoparticles can be used. In one embodiment, smaller nanoparticles are used. For example, in the case of CdSe nanoparticles, nanoparticles having a size of 1.5 nm to 30 nm, including all nm values and ranges there between, are used. Examples are shown in FIG. 20.

The surface of the nanoparticles can be controlled. A desired surface composition (e.g., surface concentration of anions or cations) can be obtained using known methods. For example, known post-particle-formation reactions can be used. As another example, a desired surface composition can be obtained without using post particle formation reactions.

In an embodiment, the nanoparticles are capped (i.e., surface functionalized) with a ligand. The ligand can make the nanoparticles soluble in a convenient solvent (e.g., water). Such ligands are known in the art. Examples of suitable ligands include dihydrolipoic acid (DHLA), mercaptopropionic acid (e.g., 3-mercaptopropionic acid), and cysteine. Such capping ligands can be used with CdSe nanoparticles. In an embodiment, depending on the composition and/or structure of the nanoparticles, ligands are used that have one or more sulfur atoms. In another embodiment, ligands are used that have at least 2 sulfur atoms.

The nanoparticles can be charged. The nanoparticles can be doped to provide charged nanoparticles. For example, the nanoparticles are doped with isovalent ions and/or non-isovalent metal ions. The isovalent ions may be magnetic. Suitable non-isovalent metal ions include $Mn^{2+}$, $Cu^{2+}$, $Co^{2+}$, and the like. Suitable non-isovalent metal ions include Group I cations, Group III cations, $Au^+$, $Ag^+$, $Al^{3+}$, and the like. Charged nanoparticles can be obtained using known nanoparticle formation reactions.

The nanoparticles can be obtained commercially or produced using methods known in the art. The nanoparticles can be soluble (or form a colloidal suspension) in an aqueous medium (e.g., water). For example, CdSe nanoparticles at a concentration of 0.5 µM to 10 µM are used. Some portion of the nanoparticles can precipitate from the mixture and the mixture continues to produce hydrogen.

Examples of suitable nanoparticles include CdSe, CdS, CdTe, PbS, PbTe, PbSe, GaAs, InP, InAs, Si, and Ge nanoparticles, any core-shell nanoparticles, including CdSe/CdS, CdSe/CdTe, CdTe/CdSe, and PbSe/PbS core-shell nanoparticles, nanorods of any of the preceding examples, and dot-in rods, including CdSe/CdS, CdSe/CdTe, CdTe/CdS, CdTe/CdSe dot-in rods. Zn-based II-VI core QDs, which are less toxic than other nanoparticles, can be used.

In an embodiment, the nanoparticles are capped with a plurality of organic molecules (or mixture of organic molecules) and the catalyst has ligands formed from the same organic molecules. DHLA is an example of such an organic molecule.

Mixtures of nanoparticles can be used. The mixture can include, but is not limited to, nanoparticles having different sizes (e.g., average diameters) and/or different compositions. For example, in one embodiment, mixtures of two or more nanoparticles having different absorbance profiles are used. In another embodiment, mixtures of at least two nanoparticles having different absorbance profiles are used.

In an embodiment, the mixture of nanoparticles has a different absorption profiles such that a greater portion of the solar spectrum is absorbed than is by one of the types of nanoparticles alone. For example, CdSe QDs can be used with QDs that absorb in the near infrared (e.g., CdTe, PbS, or PbSe) providing a nanoparticle mixture that absorbs in a greater portion of the solar spectrum than CdSe QDs alone.

The mixture of nanoparticles can be present in a variety of configurations. In an embodiment, two or more types (i.e., at least two types) of nanoparticles are mixed together in the aqueous medium. In another embodiment, multiple aqueous media (each having a different type of nanoparticle) are used. The multiple aqueous media are exposed to electromagnetic radiation (e.g., solar flux) in a desired sequence. For example, wider band gap particles absorb first letting the unabsorbed energy (e.g., infrared (IR) wavelengths) through to be absorbed by subsequent a narrower band gap particles (e.g., in a separate container).

The catalyst is any metal complex that can accept an electron from a photoexcited nanoparticle. Transition metal salts can be used. Transitions metal salts of group 6 to group 11 metals can be used. Transition metal salts of 3d metals and 4d metals (e.g., bioavailable metals such as Mo) can be used. Suitable transition metal salts include, but are not limited to, Cr, Mn, Fe, Co, Ni, Cu, Mo, Ru, Rh, Pd, Ag, W, Os, Ir, Pt, and Au salts. Mixtures of salts can be used. The salts can have one or more than one (i.e., at least two) ligands. The ligands can be organic ligands. The ligands can be monodentate or polydentate. Examples of suitable monodentate and polydentate ligands include thiolate and other sulfur ligands, as well as substituted pyridine, imine, amine, phosphine, oxime, and carboxylate ligands. The counterions are, for example, nitrate, sulfate, chloride, or any other related ion. The salts are soluble in an aqueous medium (e.g., water) or in mixed aqueous/organic solvents. In one embodiment, the catalyst has at least 1 micromolar solubility. For example, nickel catalysts having a solubility of 1 µM to 40 µM, including all values to the µM and ranges therebetween, are used.

The catalyst can be a monometallic catalyst (i.e., have a single metal center) or a multimetallic (e.g., bimetallic) catalyst (i.e., have two or more metal centers). The ligands can be monodentate ligands or multidentate ligands. The catalyst can have a 1:1 metal:ligand composition or have another ligand to metal ratio. For example, a catalyst can be a 1:1 Ni(II):DHLA complex.

The catalysts can be cationic or anionic metal-ligand complexes. The catalysts can have one or more than one (i.e., at least two) redox active ligands. For example, the catalysts can have one or more benzenedithiolate (bdt), dithiolene, pyridinethiolate ligands, or a combination thereof.

In an embodiment, the catalyst is a $Ni^{2+}$ catalyst. Examples of $Ni^{2+}$ catalysts include Ni(II)(DHLA) complexes, $(Et_4N)Ni(pyS)_3$, $Ni(pySH)_4(NO_3)_2$, $Ni(mpo)_2$ (mpo=2-mercaptopyridine N-oxide), $Ni(NO_3)_2$, $NiCl_2$, $Ni(acetate)_2$, and $Ni(P_2N_2)_2$ ($P_2N_2$=bis[2-(diphenylphosphino)phenyl]propane-1,3-diamine). Other examples of suitable catalysts include $Co(BF_4)_2$, $CoCl_2(bdt)$ (dbt=benzenedithiolate), $[Co(bdt)_2]-$, $CuCl_2$, and $K_2PtCl_4$.

In an embodiment, the catalyst is formed in situ from a metal source and ligand. The metal source can be a metal salt. For example, the metal salt is a metal chloride, nitrate, carboxylate (e.g., acetate), or hydrate thereof. Examples of suitable salts include nickel (II), copper (II), cobalt (II), and iron (II) salts.

A wide range of nanoparticle concentration and/or catalyst concentrations can be used. In one embodiment, to increase the production of hydrogen, the concentration(s) of the nanoparticle and/or catalyst is selected.

The source of electrons reduces the photoexcited nanoparticle. In one embodiment, the source of electrons is inexpensive. The source of electrons can be an internal (i.e., a part of the nanoparticle/catalyst mixture) electron donor. The internal source of electrons can form a homogeneous mixture with nanoparticles and catalyst. Internal sacrificial electron donors can be used. Such sacrificial electron donors can be present in the mixture. A fixed amount of a source of electrons can be used. For example, in one embodiment, a fixed amount of a source of electrons is an amount equal to the concentration of the nanoparticles up to the saturated amount the solution can hold. In another embodiment, a fixed amount of a source of electrons means an amount not continually added. Additional source(s) of electrons can be added to the mixture to provide a continuous hydrogen production. Hydrogen production can be continued as long as sufficient source of electrons is added or is available to the mixture. For example, the sacrificial electron donor (e.g., ascorbic acid) is present at concentrations of 0.1 M to 1 M, including all values to 0.1 M and ranges therebetween.

Examples of suitable internal sacrificial electron donors include molecular electron donors such as tertiary amines having alpha C—H bonds (e.g., triethylamine (TEA), triethanolamine (TEOA), ethylenediamine tetraacetic acid (EDTA)), ascorbic acid, hydroquinones (e.g., 1,4-dihydroxybenzene), carbohydrates (e.g., glucose and fructose), and alcohols (e.g., methanol and ethanol). Other examples of suitable discrete sacrificial electron donors include elemental carbon and elemental iron.

The source of electrons can be an external source of electrons, as opposed to an internal source of electrons. The external source of electrons is exogenous relative to the mixture of nanoparticles and catalyst. For example, a solar cell, electrochemical bias, or alternative energy source can be used as an external source of electrons.

In an embodiment, the source of electrons is a biological system. Any biological system that can generate electrons can be used. In an embodiment, the biological system comprises prokaryotes that exhibit extracellular electron transfer (EET) such as, for example, electrogenic bacteria. The bacteria can be naturally-occurring bacteria or modified bacteria (e.g., genetically modified bacteria). In an embodiment, the "source" of electrons is the growth medium (food) that the organisms consume and then convert to electrons that are transferred extracellularly. So according to this embodiment, the "biological system" then would comprise the organisms and their growth medium and/or nutrient source. The nutrient source can be, for example, bacterial growth media such as Luria-Bertani medium, organic matter, organic waste, or waste water from a natural or industrial source. Other suitable nutrient sources can be easily determine by the skilled practitioner. Mixtures of bacteria can be used.

The biological system can be an internal source of electrons or an external source of electrons. For example, in an embodiment in which bacteria are the internal source of electrons, the bacteria make electrons and "spit" them out to the bacterial surface. These electrons then "bump" into nanoparticles to reduce them. In an embodiment in which bacteria are the external source of electrons, the bacteria reduce molecules in solution (e.g., flavins) that then reduce the nanoparticles.

Examples of suitable electrogenic bacteria include members of the *Shewanella* genus (e.g., *Shewanella oneidensis* and *Shewanella putrefaciens*), *Aeromonas hydrophila*, and genetically modified *Escherichia coli* (e.g., *E. coli*-MtrC), *Shewanella oneidensis* (e.g., *Shewanella oneidensis* MR-1) and *Bacillus subtilis* (e.g., *Bacillus subtilis*-Omc expressed and -*T. potens* EET-mediating proteins expressed). Other examples of suitable electrogenic bacteria include Gram-positive bacteria such as Gram-positive dissimilatory metal-reducing bacteria. Examples of such bacteria include *Thermincola potens*. Other examples are bacteria that excrete flavins, for example, *Bacillus subtilis*, and *Bacillus megatarium*.

There are two routes for electrons to get from bacteria to the NPs. One route is "direct" EET from the bacteria to the NP. The second route is the excretion of electron shuttles such as flavins that are then capable of reducing the oxidized NP. In both cases, the original source of electrons is whatever medium serves as nutrients for the bacteria.

In an embodiment, the biological system is electrogenic bacteria in the aqueous medium. In this embodiment, the electrogenic bacteria can be physically isolated from the QDs in the aqueous medium, but electrically connected to the QDs by a porous membrane (e.g., semi-permeable cellulose membranes, porous nanocrystalline silicon membranes, and porous carbon nanotube membranes) and a small molecule mediator (e.g., methyl viologen) added to facilitate electron transfer.

In another embodiment, the biological system is electrogenic bacteria disposed (e.g., as a biofilm comprising the bacteria) on an electrode. The electrode can be external or internal to the aqueous medium.

The aqueous medium can have a variety of compositions. In an embodiment, the aqueous medium is water. In an embodiment, the aqueous medium comprises water. In another embodiment, the aqueous medium further comprises an organic solvent (or mixture of organic solvents). The organic solvent can be a protic solvent, an aprotic solvent, or a combination thereof. Examples of suitable organic solvents include alcohols such as ethanol, methanol, and ethylene glycol. For example, the aqueous medium is a 1:1 EtOH:water mixture by volume. ±

The pH of the medium can be from 2.0 to 11.0, including all pH values to 0.1 pH unit and ranges therebetween (i.e., the tolerance is to 0.1 pH unit). In one embodiment, to increase the production of hydrogen, the pH of the medium is selected. See example in FIG. 17 demonstrating $H_2$ evolution between pH 2.2 and 4.5.

Any wavelength (or wavelength range) of electromagnetic radiation that forms a photoexcited nanoparticle can be used and can be easily determined by one skilled in the art. Depending on the nanoparticle, wavelengths in the ultraviolet, visible, and near infrared can be used. Wavelengths in the solar spectrum can be used. Wavelengths greater than the energy of the lowest unoccupied molecular orbital (LUMO) of the nanoparticle(s) can be used. Wavelengths greater than the bandgap energy of the nanoparticle(s) can be used.

The electromagnetic radiation can be provided in a variety of ways. Any radiation source providing the desired electromagnetic energy wavelength(s) can be used. For example, the electromagnetic radiation can be provided by a lamp (e.g., xenon lamp), arc lamp, black body radiation source, light emitting diode (LED), laser, or sunlight. The electromagnetic radiation can be provided in a continuous manner or intermittently as desired to control hydrogen production.

The nanoparticles, catalyst, source of electrons, and aqueous medium mixture can be present in a vessel. The vessel allows exposure of the mixture to the desired electromagnetic radiation. The size of the vessel can be scaled to the desired rate of hydrogen production. Examples of suitable vessels include flasks, vials, and reactors. In the case where two or more (i.e., at least two) different nanoparticles are used, the vessel can be configured such that the different nanoparticles are physically separated from each other.

The mixture can be present in an inert atmosphere. For example, the mixture can be present in a nitrogen or argon atmosphere. The atmosphere can be a mixture of inert gases.

The methods can be carried out at a wide range of temperatures. The mixture can be at ambient temperature or elevated temperature. By ambient temperature, it is meant a temperature of 15° C. (59° F.) to 25° C. (77° F.), though differences in climate may acclimate people to higher or lower temperatures. The mixture can be present at an elevated temperature of, for example, 25° C. to 40° C.

In one embodiment, the nanoparticle photosensitizer (e.g., CdSe QDs) and the catalyst (e.g., $Ni^{2+}$ complex) operate at potentials more negative than 0 V with respect to NHE electrodes. For the photosensitizer, this means a LUMO level that is more negative than 0 V theoretically. The potential is pH dependent. For example, if the pH is greater than 0 (e.g., water having a pH of 6 to 7), the potential for $2H+ \Rightarrow H_2$ is more negative than 0 V-approximately $-0.4$ V. Also, the catalyst has some overpotential associated with it. Accordingly, in on embodiment, the LUMO is more negative than 0 V. In another embodiment, the LUMO is $-0.5$ V or lower with respect to NHE. A variety of semiconductor materials, such as II-VI or IV-VI materials, will satisfy such LUMO criterion.

Further, there must be the opportunity for contact between the catalyst and the photosensitizer. This contact can be physical contact, as exists in solution, or electrical if a wire that meets the aforementioned LUMO criteria is used.

In an embodiment, the nanoparticle photosensitizer and catalyst are robust under the conditions of the method. In an embodiment, the properties of the photosensitizer and catalyst are unchanged after 24 hours of continuous exposure to electromagnetic radiation. By unchanged it is meant the spectroscopic properties of the photosensitizer and catalyst are not changed by more than 5%. In various embodiments, the properties of the photosensitizer and catalyst are unchanged after 48 hours, 96 hours, or 200 hours of continuous exposure to electromagnetic radiation.

In an embodiment, the turnover number is at least 2,500 mole $H_2$/mole catalyst/hour. In various embodiments, the turnover number is at least 5,000, 6,000, or 7,000 mole $H_2$/mole catalyst/hour.

In an embodiment, the method produces hydrogen continuously for at least 75 hours without addition of the nanoparticle photosensitizer or catalyst. In various embodiments, the method produces hydrogen for at least 100, 200, 300, or 400 hours without addition of the photosensitizer or catalyst.

The following examples are offered by way of illustration and not by way of limitation.

6. EXAMPLES

6.1. Example 1: Hydrogen Producing System

This is an example of a hydrogen producing system provided by the present disclosure.

Semiconductor nanocrystals (NCs) are promising alternative chromophores for light driven proton reduction. Compared to traditional organic chromophores, NCs have superior photostability, larger absorption cross-sections over a broad spectral range, much longer excited state lifetimes, size-tunable electronic and optical states, and the ability to possess and deliver multiple electrons with minimal perturbations to the nanocrystal.

This example provides a light-driven $H_2$ production system with desirable longevity, maintaining its activity with no decrease for over two weeks (FIG. 19) using water as solvent. The system is based on light absorption and photoinduced electron transfer from semiconductor nanocrystals that are photolytically stable. The system generates over 600,000 turnovers of $H_2$ without deterioration of activity, and thus has significant promise for incorporation into full AP systems.

Hydrophobic CdSe NCs with diameters varying from 2.5 to 5.5 nm (defined based on their excitonic absorption feature as NC(520) and NC(620) respectively, FIGS. 4A-B) were synthesized by variations of previously known methods. NCs were subsequently made water soluble by capping with dihydrolipoic acid (DHLA, FIG. 1). Photolysis experiments were performed in a custom-built 16-sample apparatus with excitation at 520 nm with an uncertainty of 7.0% in the amount of $H_2$ produced (based on multiple-run experiments). Each 40 mL sample vessel contained 5.0 mL of solution and a sensor to allow real-time monitoring of head space pressure. Ascorbic acid (AA, 0.1 to 1.0 M) was used as the sacrificial electron donor, because reduction of protons by ascorbate is thermodynamically unfavorable ($\Delta E = -0.41$ V) under these conditions, and light energy is needed to bring about $H_2$ production (FIG. 1).

Figure 4A:
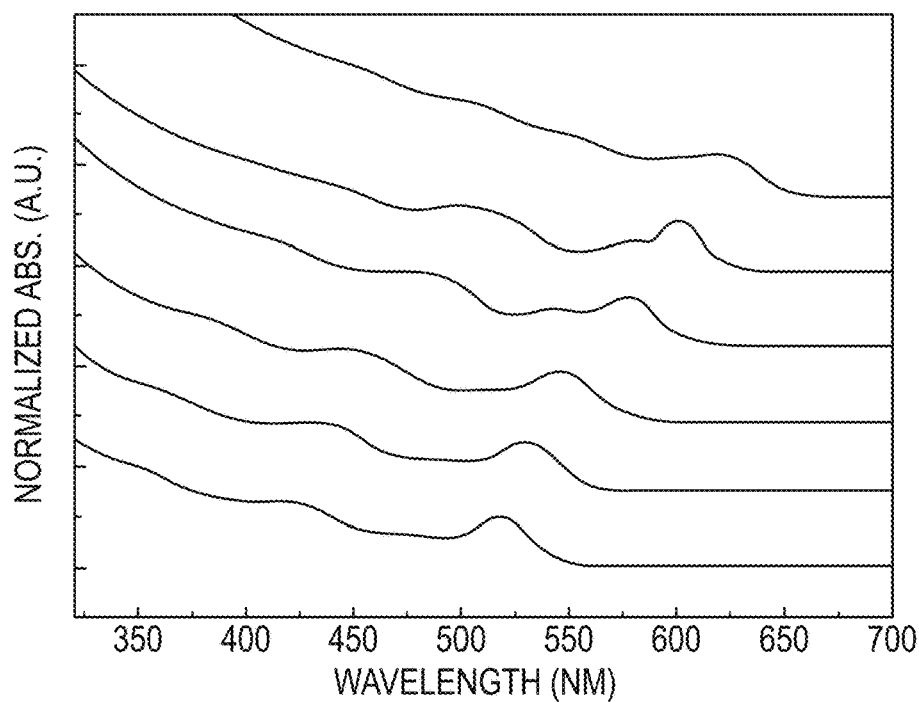
Figure 4B:
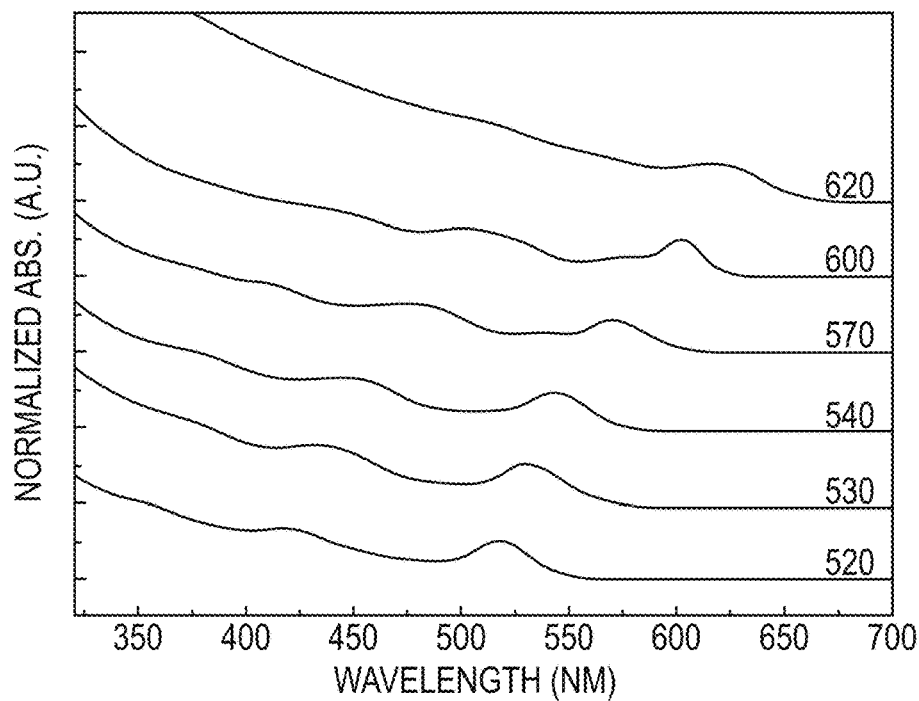
Figure 5:
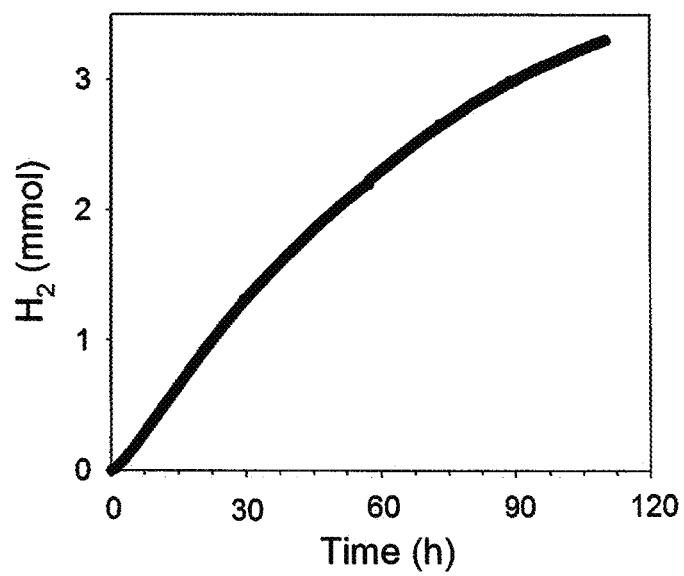
Figure 6:
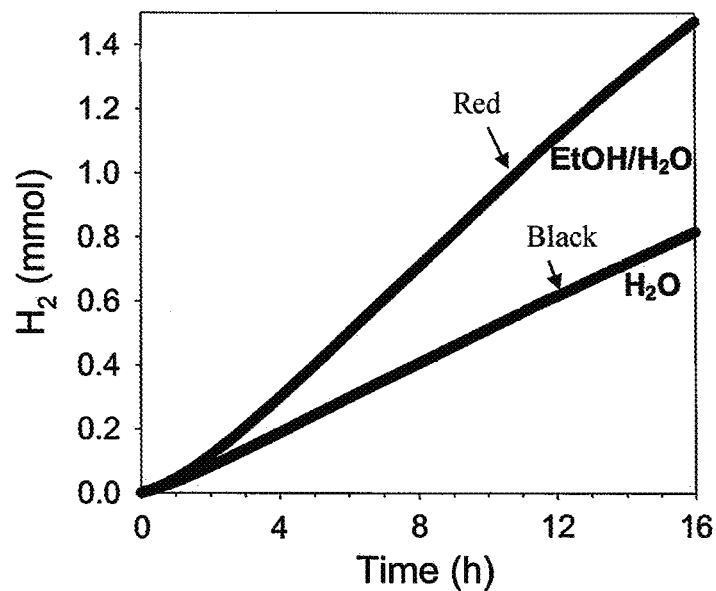

In a typical experiment, production of hydrogen occurred upon photolysis of a solution formed from nickel(II) nitrate and NCs in water. A control experiment without added $Ni^{2+}$ yields no significant $H_2$ production (FIG. 2A). Using the following combination of system components, 1.0 µM [Ni(NO$_3$)$_2$], 5.0 µM [NC(540)], and 0.8 M AA at pH 4.5 in water, this system achieves a turnover number (TON) over 600,000 mole $H_2$/mole catalyst after 110 hours and an initial turnover frequency (TOF) of 7,000 mole $H_2$/mole catalyst/hour (FIG. 5). Even higher activity is obtained under the same photolysis conditions if the solvent is changed to 1:1 EtOH/$H_2O$ (FIG. 6).

Figure 7:
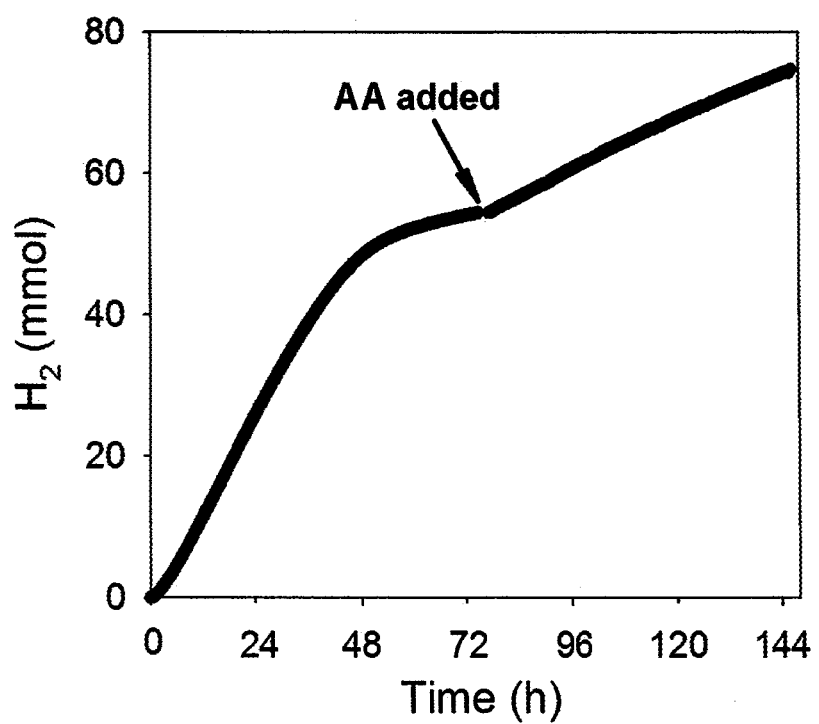

In this system, the initial rate of $H_2$ production is maximized when [AA]=0.3 M (FIG. 2B), and slows over time only upon depletion of the electron donor AA. Consistent with this interpretation, subsequent addition of AA restarts $H_2$ production (FIG. 7). With a high [AA]$_{initial}$=1.0 M, the system continues to produce $H_2$ over 360 hours (FIG. 2A). This unusual longevity is attributed to the use of NCs as photosensitizers, because other systems using transition metal catalysis and small-molecule photosensitizers (organic dyes, or Ru, Ir, Rh or Re coordination compounds) cease activity in under 50 hours due to bleaching of the dye.

It is believed that the catalytic system functions through light absorption by the CdSe nanocrystal, then electron transfer to the catalyst, then proton reduction by the catalyst. The absorption of the first excitonic state can be controlled by NC size, which correlates with the reduction potential of the excited state. As the NC size is made smaller, the activity of the system for $H_2$ production increases (FIG. 3A), which we attribute to an increase in NC reducing power. Conversely, there is no formation of $H_2$ with NC(620), presumably because the reduction potential for NC(620) lies below that needed for catalyst activity. Because the NC absorption edge is to the blue of the LED spectral emission profile, the system with NC(520) produces less $H_2$ than an identical one with NC(540) due to reduced light absorption.

Figure 8:
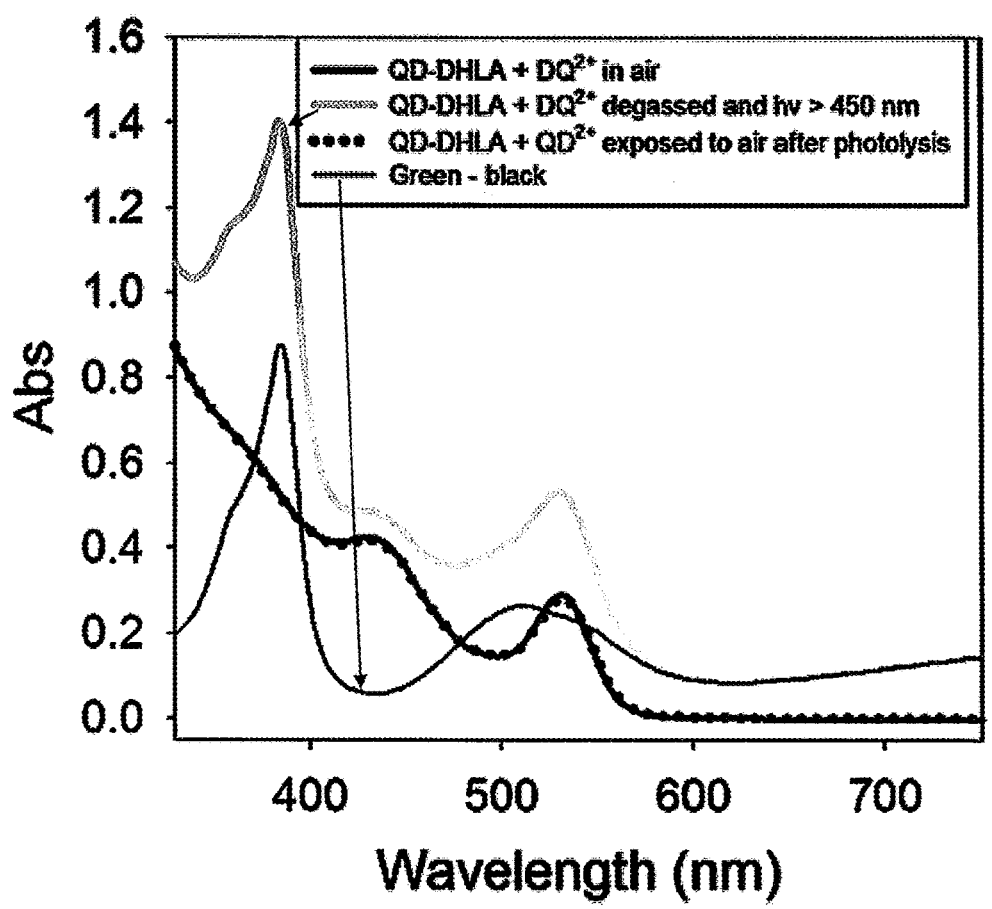

Reducible organic compounds were also used as indicators for the reducing power of the CdSe NCs. When a 3.8 µM solution of NC(530) in 1:1 EtOH/$H_2O$ is photolyzed in the presence of methyl viologen dication ($MV^{2+}$) under $N_2$ for 5 min, the development of an intense blue color indicates formation of the reduced viologen $MV^{+\bullet}$. A similar result was obtained using a diquat acceptor $DQ^{2+}$ (N,N'-(1,3-propylene)-5,5'-dimethylbipyridine), as indicated by the pink color of the reduced $DQ^{+\bullet}$ (FIG. 8). While the precise potential for each NC was not determined, the result for $DQ^{2+}$ shows that the reducing ability of NC(530) is more negative than $-0.7$ V versus NHE. These measurements agree with literature cyclic voltammetric studies that indicate a reduction potential more negative than $-1$ V for CdSe NCs of this size.

Figure 9:
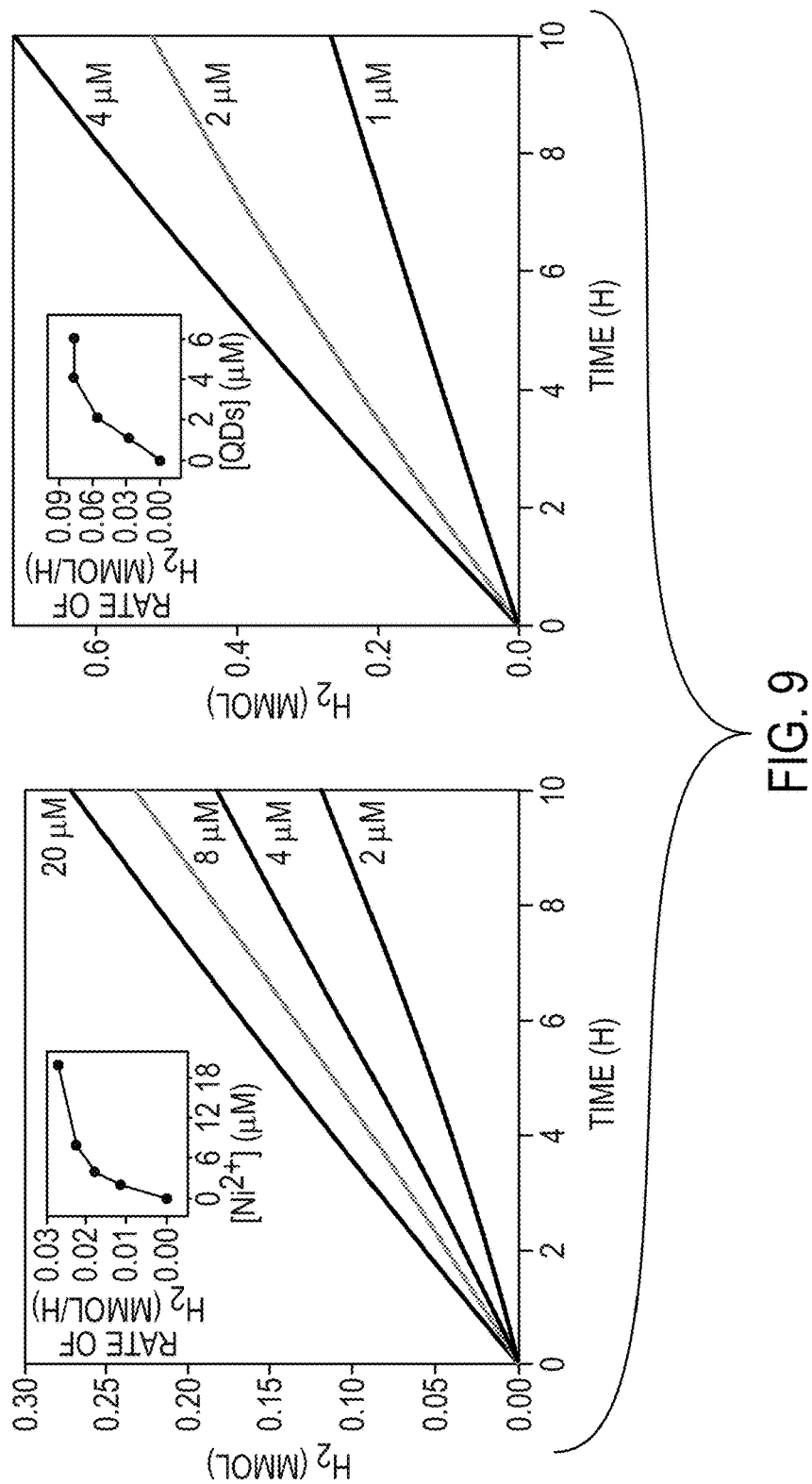
Figure 10:
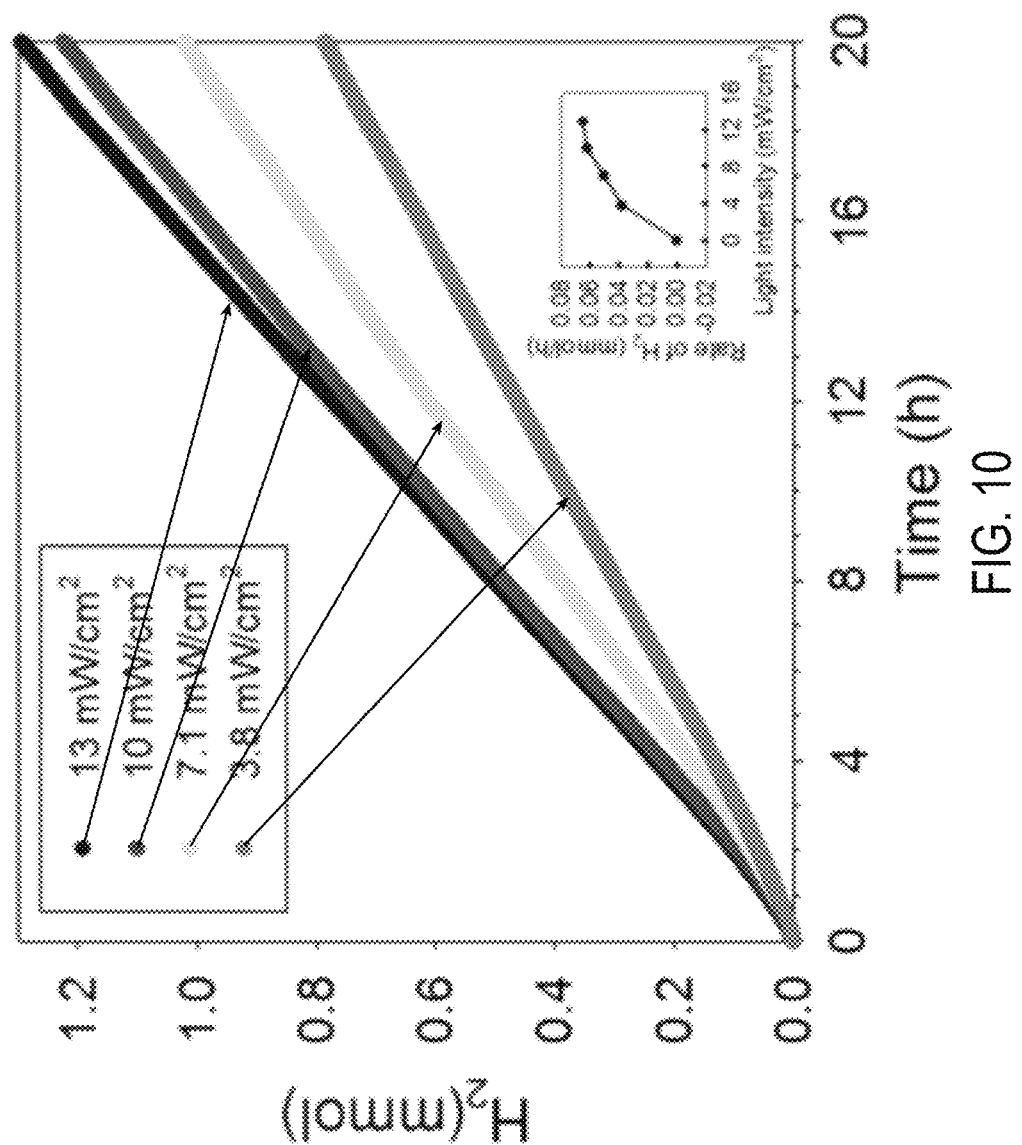

The catalytic mechanism for this system was evaluated by varying the concentrations of system components. When [$Ni^{2+}$] is varied, the rate of $H_2$ production reaches a maximum at 20 µM [$Ni^{2+}$], whereas when the concentration of NC(520) is varied, the rate plateaus above 4.0 µM [NC] (FIG. 9). These results suggest that at [$Ni^{2+}$] of 20 µM or greater, the rate becomes limited by NC light absorption, whereas at [NC] of 4.0 µM, the system becomes limited by the $H_2$-forming reaction at $Ni^{2+}$. Similarly, when changing the light intensity, the rate of $H_2$ production reaches a maximum at 13 mW/cm$^{-2}$, at which point the rate becomes limited by NC light absorption for the system (FIG. 10).

Quantum yields for $H_2$ generation were determined for the system at [$Ni^{2+}$]=20 µM (where the rate of $H_2$ evolution is controlled by [NC]) with NCs of different sizes. The quantum yield $\phi$ based on two photons per $H_2$ evolved is approximately 36% at [NC(520)]=1-2 µM, decreasing to 20% at [NC(520)]=4.0 µM; similarly, $\phi(H_2)$ is 35% at [NC(540)]=4.0 µM.

Figure 11:
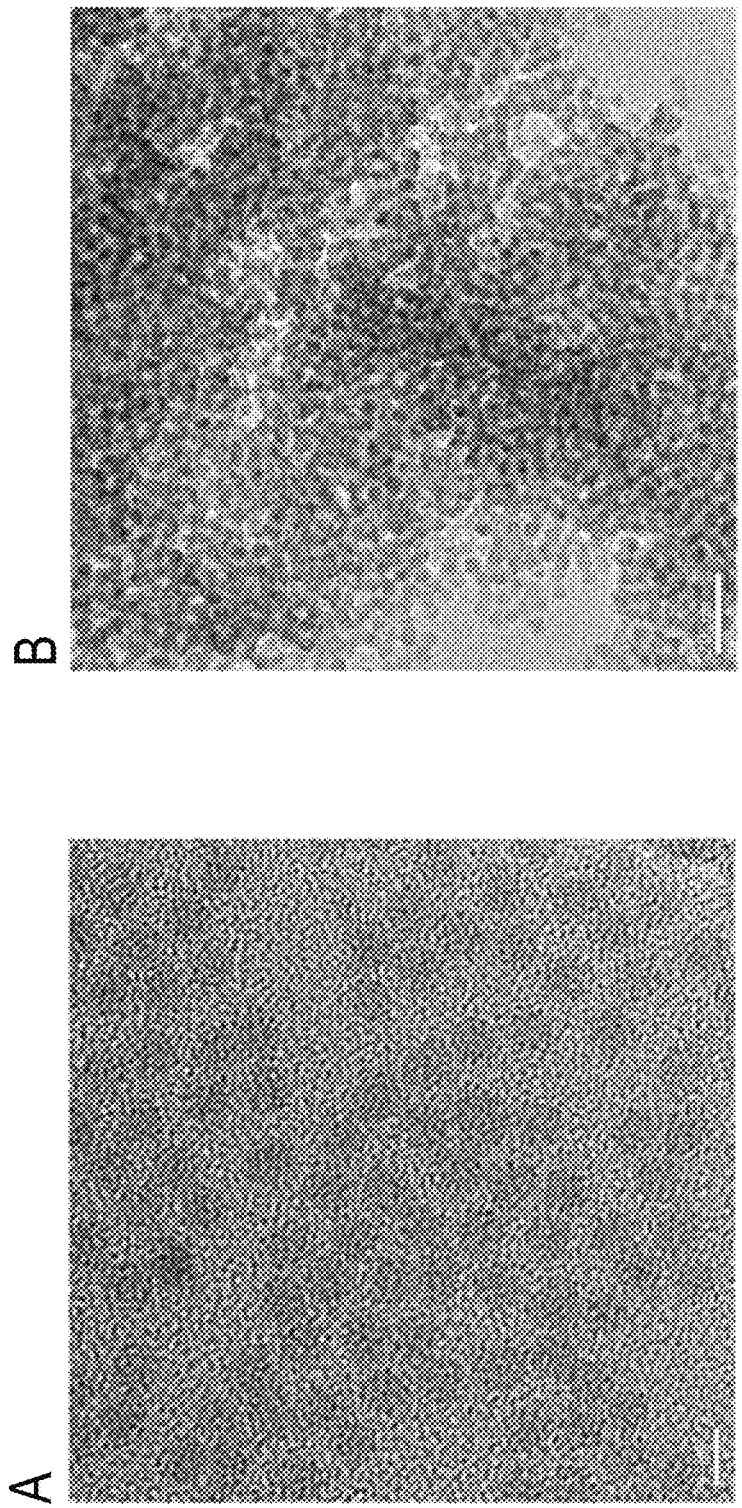
Figure 12:
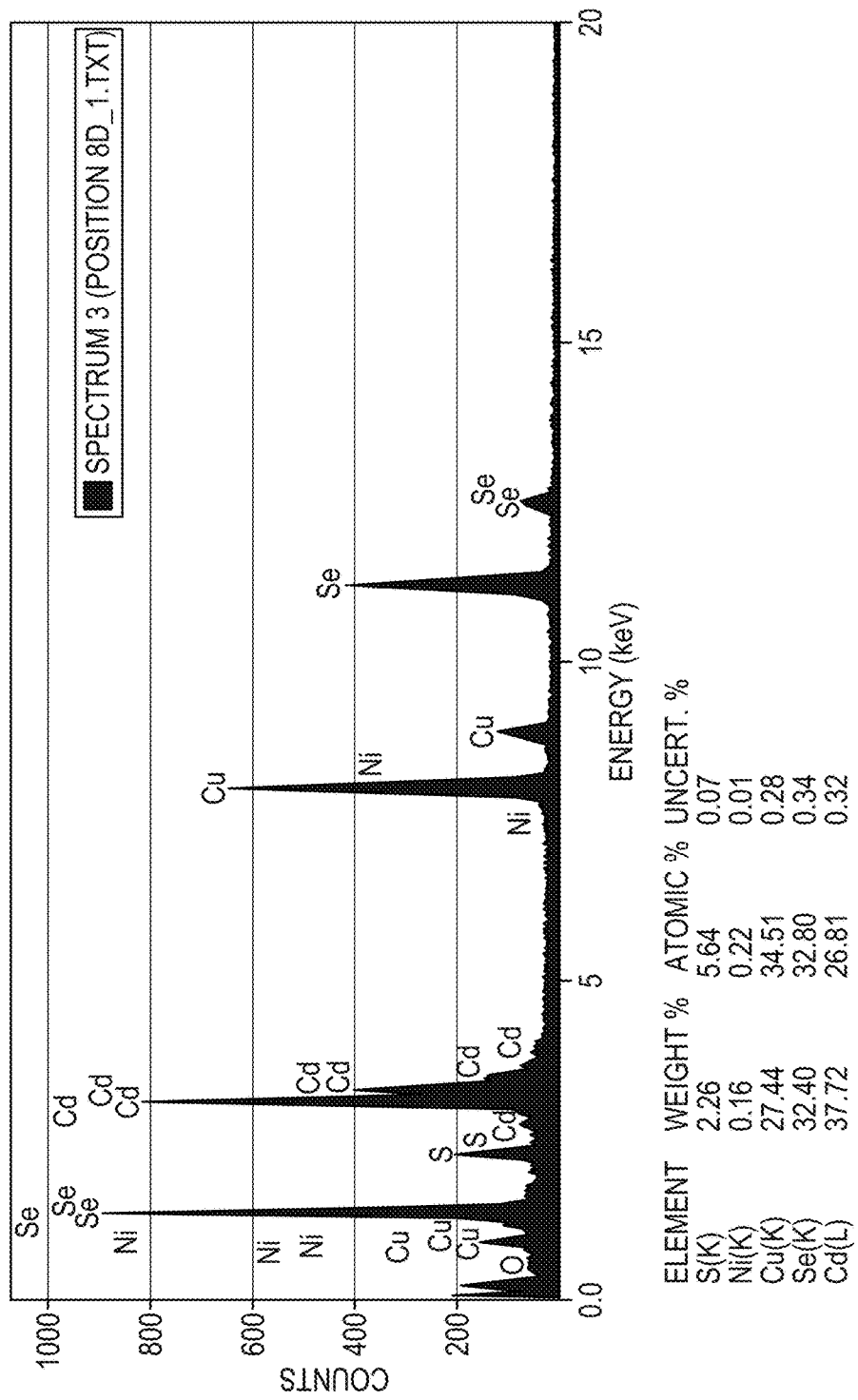

Whether or not the active catalyst is on the NC surface or in solution during photolysis can be determined After photolysis of a NC(540)-based $H_2$ generating system for 24 hours, the NCs were separated from the solution by centrifugation and filtration, and each component was examined separately for its $H_2$ generating activity with added AA. Neither the NCs nor the solution was found to have any significant activity for photolytic $H_2$ generation. The chemical composition of the NCs and solution were each examined by atomic absorption spectroscopy, showing that >97% of the Ni and <3% of the Cd remained in solution while >97% of Cd and <3% of the Ni remained in the precipitated NCs (Table 2). Additionally, TEM images of the separated NCs showed no significant change in NC size, and energy dispersive X-ray analysis showed no evidence of colloidal Ni deposited on the NC surface (FIGS. 11A-B, FIG. 12). Addition of $Ni^{2+}$ and AA to the NCs restored activity for $H_2$ production upon resuspension; likewise, when fresh NC(540) and AA were added to the Ni-containing solution, we observed activities that were similar to those during the initial photolysis (FIG. 3B). The results clearly indicate that the active catalyst is a Ni species generated in solution, and that the NCs maintain their ability to act as the photosensitizer during the catalytic process.

Figure 13:
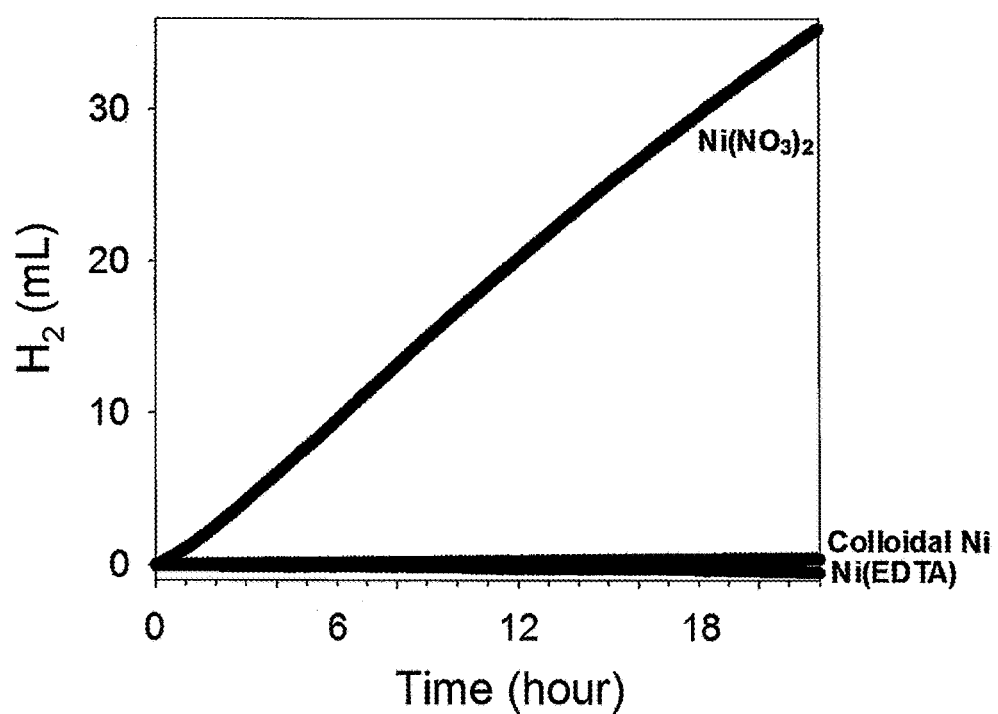
Figure 14:
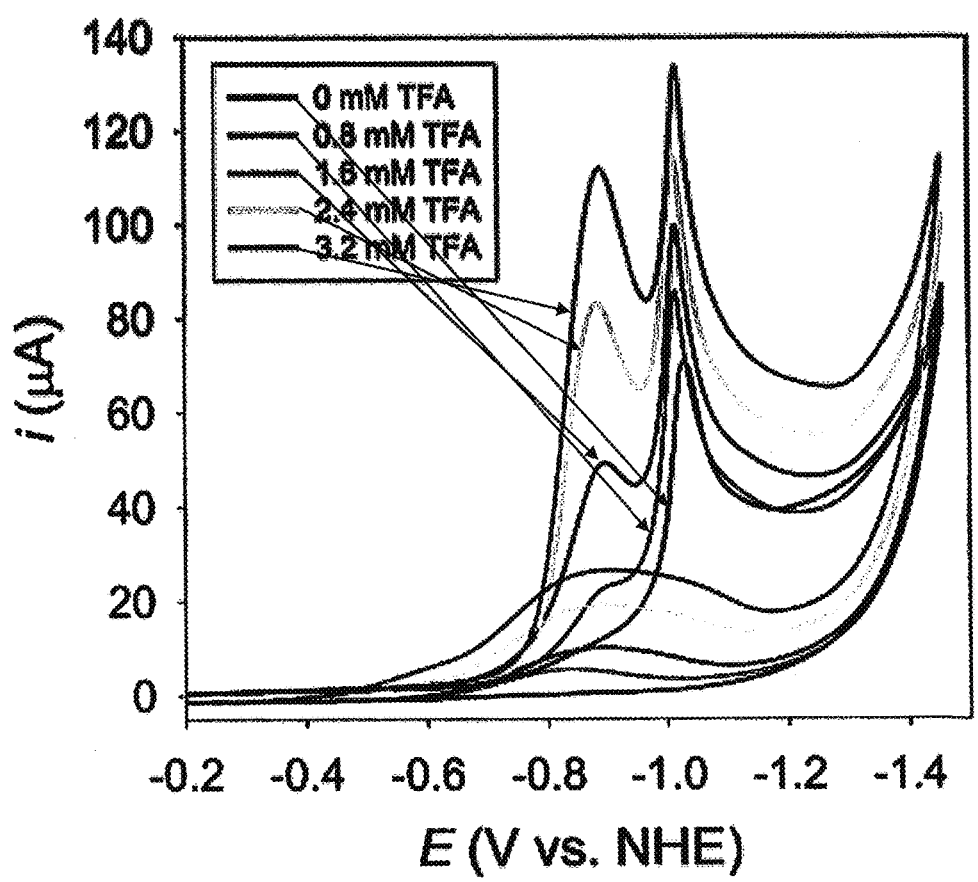
Figure 17:
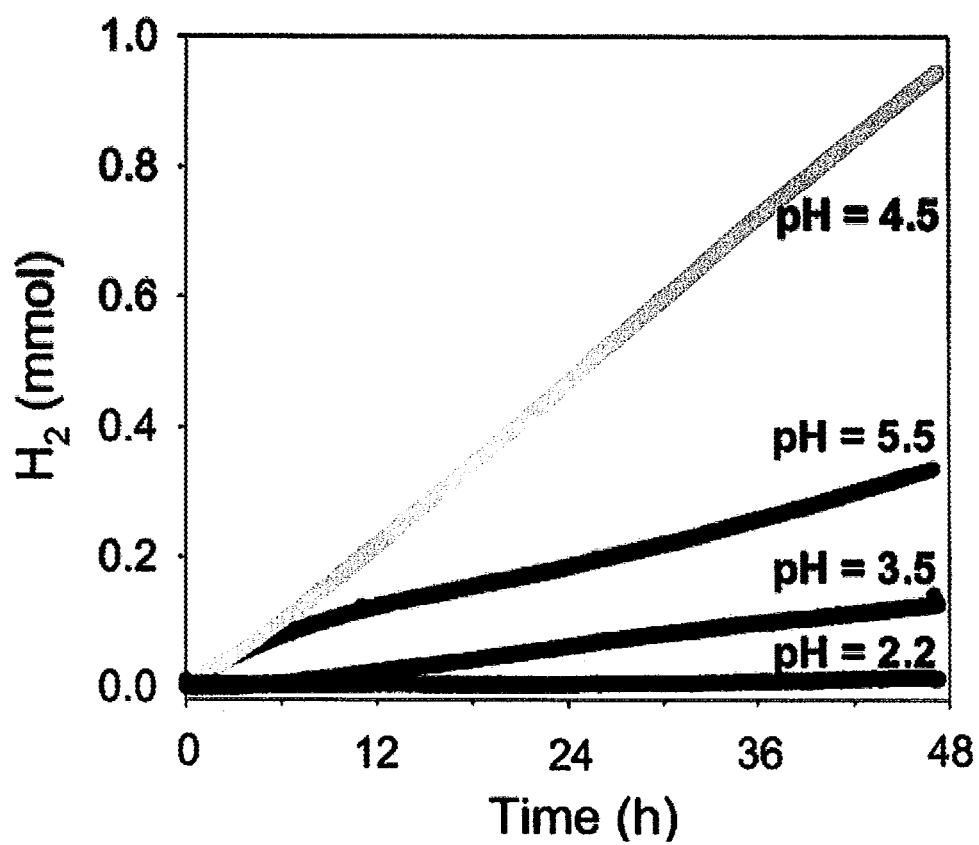
Figure 18:
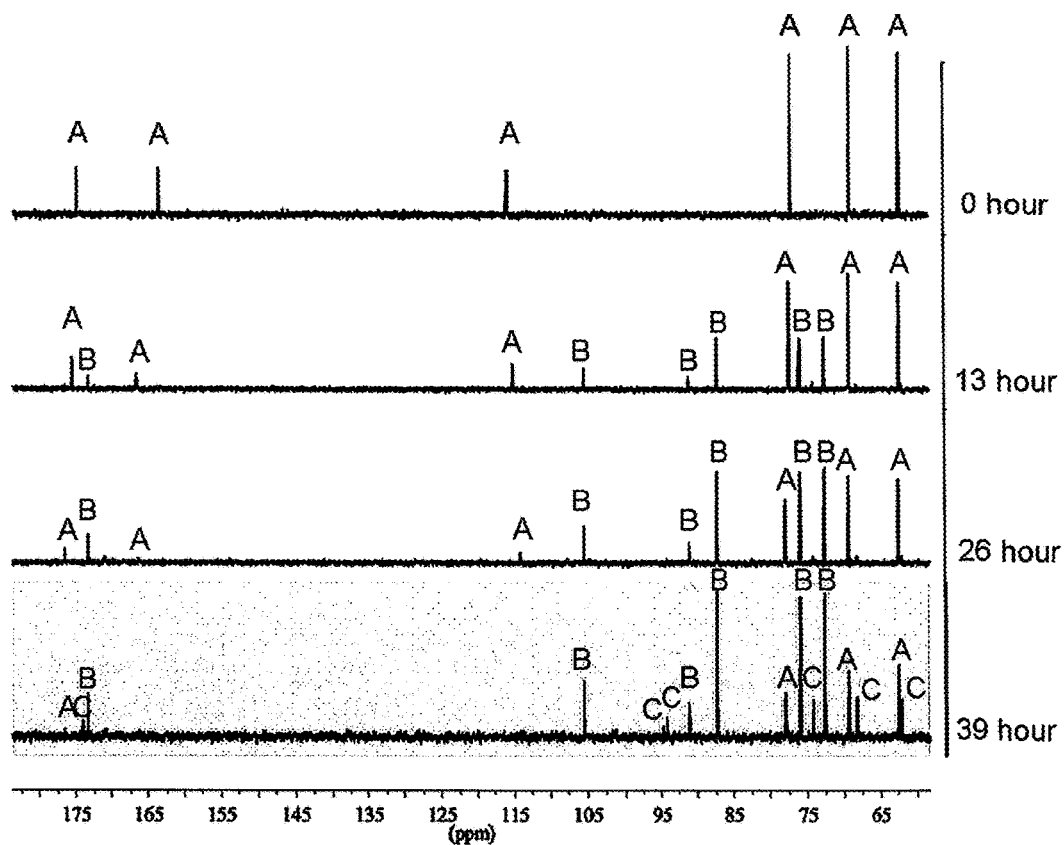
FIG. 18 shows time dependence of $^{13}C$ NMR spectra in solutions containing CdSe-DHLA NC(520) (4.0 µM), $Ni(NO_3)_2$ (4.0 µM), AA (0.3 M) in $D_2O$ (5.0 mL) at pH 4.5 upon irradiation with 520 nm LED (13 mW/cm$^2$). Label for resonances are as follows: (A) ascorbic acid, (B) hydrate dehydroascorbic acid, (C) dihydrate dehydroascorbic acid.
Figure 19:
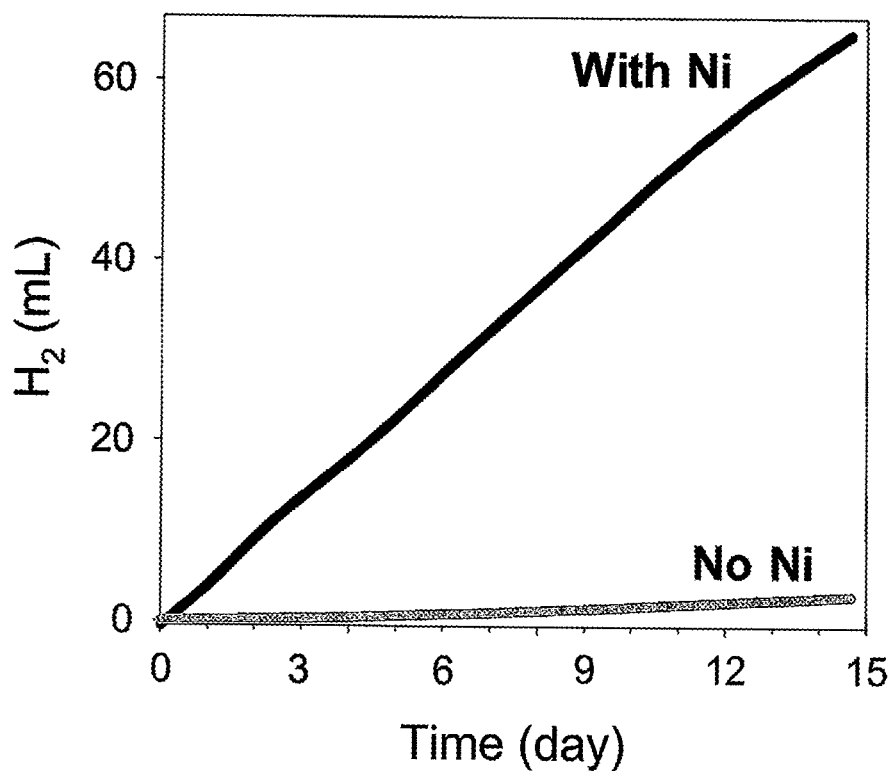
Figure 20:
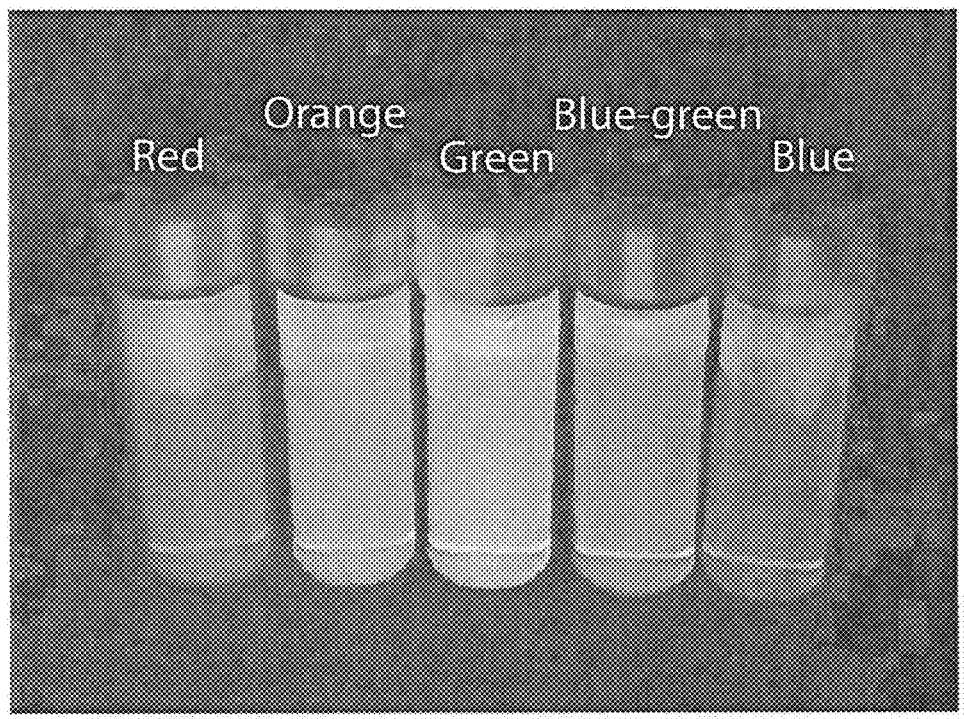
Figure 21:
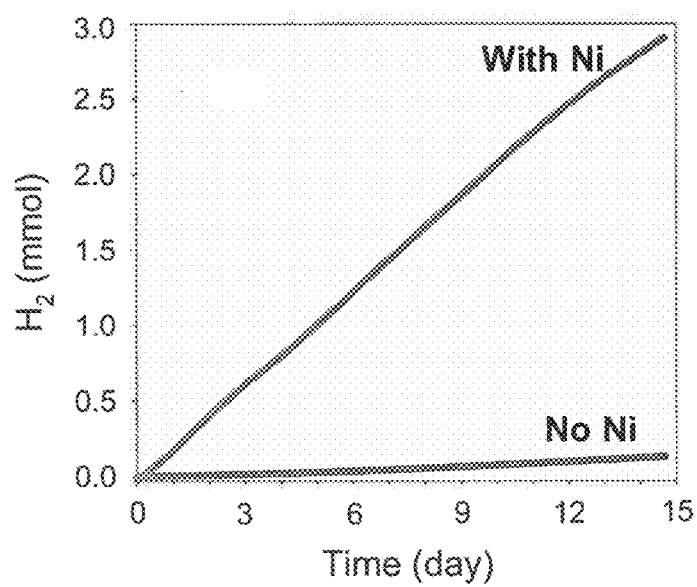
FIG. 21 shows hydrogen production from systems containing CdSe-DHLA (0.5 µM), $Ni(NO_3)_2$ (10 µM) and ascorbic acid (1.0 M) in $H_2O$ (5.0 mL) at pH 4.5 upon irradiation with 520 nm light.

The use of different $Ni^{2+}$ salts ($Ni(NO_3)_2$, $NiCl_2$ and $Ni(acetate)_2$) produces a similar level of $H_2$ production activity, suggesting that the actual catalyst is generated in situ. Maintaining a solution of NC(520) at pH 4.5 under $N_2$ in the absence of light for 5 hours and centrifuging to precipitate the NCs gave a solution with 8-14 molecules of DHLA per NC, which had apparently dissociated from the NC. Thus the formation of a $Ni^{2+}$-DHLA complex is both possible and favorable in the catalytic solutions. Adding up to 100 equivalents of excess DHLA gave similar activity toward $H_2$ production rates, but addition of EDTA (which sequesters $Ni^{2+}$ and prevents formation of a $Ni^{2+}$-DHLA complex) eliminated activity (FIG. 13). Addition of colloidal $Ni^0$ (4 nm in diameter) in place of the nickel(II) salt gave no significant amount of $H_2$ under the standard catalytic conditions (FIG. 13). These experiments are consistent with a soluble nickel(II)-DHLA species being catalytically active. Finally, electrochemical studies on independently prepared 1:1 $Ni^{2+}$-DHLA solutions (0.2 μM in 1:1 EtOH/H2O) show a cathodic feature at −0.9 V versus NHE that appears upon addition of acid (FIG. 14), indicating that Ni-DHLA can reduce protons catalytically at a potential less negative than that produced by the excited NCs.

Although the structure of the catalytically active nickel species has not yet been determined, spectroscopic studies on $Ni^{2+}$-DHLA help to understand the predominant forms of nickel in solution. The UV-visible spectrum of a 1:5 mixture of $Ni^{2+}$ (50 μM) and DHLA (250 μM) at pH 4.5 is very similar to that generated with a mixture of $Ni^{2+}$ (50 μM) and 1,3-propanedithiol, suggesting that $Ni^{2+}$ coordinates via the S donors of DHLA (FIG. 15). The absorption maxima from a 1:1 Ni-DHLA solution follow Beer's Law between 5.0 and 500 μM, indicating that nickel speciation does not change over the [$Ni^{2+}$] and [DHLA] concentrations employed in the catalytic experiments (FIG. 15). A Job plot of $Ni^{2+}$ and DHLA in this concentration regime has a maximum at a metal/DHLA ratio of roughly 1:1, suggesting that the predominant complex has one DHLA per $Ni^{2+}$ (FIG. 16). Reports of nickel complexes and related dithiols (including 1,3-propanedithiol) have shown multimetallic structures containing square-planar nickel(II) centers bridged by thiolates, with stoichiometries such as 3:4, 4:4, 6:6, and 6:7. Since nickel-thiolate species are labile in solution, many nickel species are accessible under the reaction conditions, and detailed mechanistic studies will be necessary to identify the one(s) responsible for proton reduction in this system.

A light-driven system for the photogeneration of hydrogen that comprises simple components containing only Earth-abundant elements could have a significant impact on the sustainable production of chemical fuels. Further, the robustness of the system may be generalizable to other nanoparticle systems, such as Type II NCs and dot-in-rod NCs, which are better engineered for charge separation. This particular NC-DHLA-Ni system exhibits high activity for proton reduction and impressive durability, which suggests that it could also serve as a valuable component in complete AP water splitting systems for light-to-chemical energy conversion.

Materials and Methods. General Considerations. CdSe nanocrystals (NCs) (13), dyhydrolipoic acid (DHLA) and colloidal $Ni^0$ were synthesized by modified methods from literature. All solvents were used without further purification unless otherwise stated. Nickel(II) chloride hexahydrade, nickel(II) nitrate hexahydrade, nickel (II) acetate tetrahydrade, ascorbic acid (AA), 1,3-propanedithiol (1,3-PDT), and potassium nitrate were purchased from Aldrich and used without further purification.

Nanocrystal Synthesis. Abbreviations: $CdAc_2$ cadmium acetate, ≥99%; HDA 1-hexadecylamine, ≥99%; TDPA n-tetradecylphosphonic acid, 98%; TOP tri-n-octylphosphine, 97%; TOPO tri-n-octylphosphine oxide, 99%; TOP-Se tri-n-octylphosphine-selenide. TOPO (4.0 g), HDA (2.5 g) and TDPA (0.075 g) were added into a three-neck flask. These reactants were sealed and degassed under a slight vacuum at 100° C. for half an hour under anaerobic conditions. Under an argon atmosphere, 1 mL of 1 M TOP-Se (made previously by dissolving 0.7896 g Se in 10 mL TOP), was injected into the flask. Then, the solution was degassed under vacuum for another 15 min, switched over to an Ar atmosphere, and heated to 300° C. At this time, 1.5 ml Cd-TOP (made by dissolving 0.12 g $CdAc_2$ in 3 mL TOP) was injected swiftly. The temperature of solution was immediately set to 260° C. for CdSe nanocrystal growth, followed by cooling to room temperature. The size of CdSe nanocrystals was controlled by varying the growing time and the solvent concentration.

Dihydrolipoic acid (DHLA) preparation. A total of 1.2 g of sodium borohydride ($NaBH_4$) was added to a solution of α-lipoic acid (6.00 g) in 117 mL of 0.25 M sodium bicarbonate ($NaHCO_3$). The reaction was stirred at 0° C. for 1 hour. The colorless reaction mixture was acidified to pH 1 with 5 M hydrochloric acid (HCl) at 0° C. and then extracted with dichloromethane ($CH_2Cl_2$) twice and finally washed with a saturated sodium chloride (NaCl) solution once. The organic phase was dried over magnesium sulfate ($MgSO_4$), filtered and the solvent removed by rotary evaporation.

Typical synthesis of DHLA-CdSe nanocrystals. Typically, 100 μL DHLA was added to a 12 mL solution of methanol containing approximately 200 nmol CdSe nanocrystals and 154 mg tetramethylammonium hydroxide pentahydrate. This reaction was then refluxed under nitrogen at 65° C. for 6 hours. Twice the CdSe-DHLA nanocrystals were washed by precipitating from methanol using a mixture of ethyl acetate and ether followed by centrifugation. The washed CdSe-DHLA sample was suspended in phosphate buffered saline.

Characterization of Nanocrystals by Absorption Spectroscopy. UV-VIS absorption spectra were taken on a Perkin-Elmer Lambda 950 UV/Vis/NIR spectrophotometer. Aqueous NC samples were dissolved in phosphate buffered saline (PBS) solution and placed in a 1 cm path length cuvette. Organic capped NCs were measured with hexane as the solvent.

Transmission electron microscopy and Energy dispersive X-ray analysis. Transmission electron microscopy (TEM) images were taken on a FEI TECNAI F-20 field emission microscope at an accelerating voltage of 200 kV. Energy dispersive X-ray Spectroscopy (EDS) analysis of the NCs was also carried out on the same TEM operating in STEM mode.

LED Photolysis Set-up for Hydrogen Evolution Studies. Samples were prepared in 40 mL scintillation vials and protected from light before use. Varying amounts of $Ni^{2+}$, CdSe-DHLA NCs and AA in $H_2O$ or 1:1 EtOH/$H_2O$ were added to obtain a total volume of 5.0 mL. The pH of this solution was adjusted to a specific pH by adding HCl or NaOH and measured with a pH meter. The samples were placed into a temperature controlled block at 15° C. and sealed with an air-tight cap fitted with a pressure transducer and a septum. The samples were then degassed with 4:1 $N_2/CH_4$ atmosphere (1 atm), and the $H_2$ peak was measured at the end of each experiment relative to that of $CH_4$ being used as an internal reference for GC analysis. The cells were irradiated from below the vials with high power Philips LumiLED Luxeon Star Hex green (520 nm) 700 mA LEDs. The light power of each LED was set to 70 mW and measured with an L30 A Thermal sensor and a Nova II power meter (Ophir-Spiricon LLC). The samples were swirled using an orbital shaker. The pressure changes in the vials were recorded using a Labview program from a Freescale semiconductor sensor (MPX4259A series). At the end of the irradiation the headspace of the vials were sampled by gas chromatography to ensure that the measured pressure change was caused by $H_2$ generation, and to double check that the amount of generated hydrogen calculated by the change in pressure corresponded to the amount determined by the GC. The amounts of hydrogen evolved were determined using a Shimadzu GC-17A gas chromatograph with a 5 Å molecular sieve column (30 m, 0.53 mm) and a TCD detector, by injecting 100 μL of headspace into the GC, and were quantified by a calibration plot to the internal $CH_4$ standard.

Quantum Yield Measurement. The difference between the power of light passing through the blank (containing $Ni(NO_3)_2$ and AA) and through the sample (containing CdSe NCs, $Ni(NO_3)_2$ and AA) was used to calculate the light absorbed by the NCs, for four samples, with 1.0 μM NC(520), 2.0 μM NC(520), 4.0 μM NC(520), and 4.0 μM NC(540), with 20 μM $Ni(NO_3)_2$ and 0.5 M AA in $H_2O$ (pH=4.5). The power of the light "P" (in Watts), corresponding to the difference in power between the solution containing NCs and the reference sample, was measured with a L30 A Thermal sensor and a Nova II Power meter (Ophir-Spiricon LLC). The average rate of hydrogen production "k" (mol of $H_2$/s) was determined by taking amount of $H_2$ generated from the first 10 hours illumination. The quantum efficiency "φ" was calculated by determining the number of moles of hydrogen produced per second, and dividing it by the number of moles of photons absorbed by the system per second (two photons per $H_2$).

Where λ was taken to be 520 nm, h is Planck's constant (in J/s), c is the speed of light (in m/s), n is the number of photons, t is the time (in second), $q_p$ is the photon flux (number of photons per second). The average of the quantum yield for each sample was taken and the uncertainties reported arise from slight differences in sample preparation, power meter readings and pressure sensor measurements.

Table 1 shows quantum yields of $H_2$ production for NC(520) and NC(540) at 520 nm light.

TABLE 1

Quantum yields of $H_2$ production for NC(520) and NC(540) at 520 nm light.

| [NCS] (μM) | $k^a$ (mol $H_2$/s) | $P^a$ (W) | $q_p^a$ (mol photo/s) | $\phi_2^a$ (%) |
|---|---|---|---|---|
| 1.0 μM NC(520) | 6.21 (0.56) × $10^{-9}$ | 0.008 (0.002) | 3.48 (0.87) × $10^{-8}$ | 36 (10) |
| 2.0 μM NC(520) | 1.33 (0.12) × $10^{-8}$ | 0.017 (0.002) | 7.39 (0.87) × $10^{-8}$ | 36 (5.0) |
| 4.0 μM NC(520) | 1.53 (0.14) × $10^{-8}$ | 0.035 (0.002) | 1.52 (0.87) × $10^{-7}$ | 20 (2.1) |
| 4.0 μM NC(540) | 3.55 (0.32) × $10^{-8}$ | 0.047 (0.003) | 20.4 (0.87) × $10^{-7}$ | 35 (3.9) |

$^a$errors based on three parallel experiments were indicated in parenthesis.

Sample Calculation for QY:

$H_2$ generated in 10 hours: 10.7 mL

Mol of $H_2$ in 10 hours: $4.78 \times 10^{-4}$ mol $k = 4.78 \times 10^{-4} / 36000 = 1.33 \times 10^{-8}$ mol/s $$q_p = (P^*\lambda)/(c^*h) = [(0.017 \text{ J/s}) \times (520 \times 10^{-9} \text{ m})]/[$$
$$(3.0 \times 10^8 \text{ m/s})(6.626 \times 10^{-34} \text{ J/s})] = 4.45 \times 10^{16}$$
$$s^{-1} = 7.39 \times 10^{-8} \text{ mol/s}$$
$$\phi_2 = 2k/q_p = (2 \times 1.33 \times 10^{-8} \text{ mol/s})/(7.39 \times 10^{-8} \text{ mol/s}) = 36\%$$

Ni and Cd Detection by Atomic Absorption Spectra. Cadmium and nickel determinations were performed using a Perkin-Elmer PinAAcle 900Z atomic absorption spectrophotometer (AAS) equipped with longitudinal Zeeman background correction and a transverse heated graphite furnace (Perkin-Elmer Life and Analytical Sciences, Shelton, Conn. 06484 USA). Cadmium absorption was measured at 228.8 nm using a Perkin-Elmer System 2 electrodeless discharge lamp source. A mixed matrix modifier of ammonium phosphate and magnesium nitrate was used to stabilize cadmium during the pyrolysis furnace step. Nickel absorption was determined at 232 nm using Perkin-Elmer Lumina hollow cathode lamp. Samples were prepared by taking 1 mL aliquots to dryness on a 90° C. hotplate. The residue was dissolved in 200 μL of 70% ultrapure nitric acid (Baseline, SeaStar Chemicals Inc., Sidney, BC, Canada V8L3S8) and the volume adjusted to 10 mL with 18 MΩ deionized water.

AAS Conditions for Cadmium Analysis

| Wavelength | 228.8 nm |
|---|---|
| Slit width | 0.7 nm |
| Cd lamp current | 230 mA |
| Background correction | Zeeman-effect |
| Integration time | 3 seconds |
| Injection volume | 12 μL |
| Matrix modifier volume | 3 μL |

AAS Conditions for Nickel Analysis

| Wavelength | 232 nm |
|---|---|
| Slit width | 0.2 nm |
| Ni lamp current | 25 mA |
| Background correction | Zeeman-effect |
| Integration time | 4 seconds |
| Injection volume | 20 μL |

Two parallel solutions (A and B) containing CdSe-DHLA NC(520) (4.0 μM), $Ni(NO_3)_2$ (4.0 μM), AA (0.5 M) in 1:1 $EtOH/H_2O$ (5.0 mL) at pH 5.0 were photolyzed with 520 nm LED (13 mW/cm$^2$) for 24 hours. The solutions were then centrifuged at ~3000 rpm for 10 min. The supernatants and NCs collected from centrifugation were dissolved in concentrated nitric acid and the final volume of each was brought up to 10.0 mL for AAS analysis for both Ni and Cd concentrations. The concentrations of Ni and Cd were calculated based on standard calibration curves.

Table 2 shows Ni and Cd detection for the photolysis solutions by Atomic Absorption Spectra

TABLE 2

Ni and Cd detection for the photolysis solutions by Atomic Absorption Spectra

|  | $Ni_{initial}$ (mol) | $Ni_{detected}$ (mol) | $NC_{initial}$ (mol) | $Cd_{detected}$ (mol) |
|---|---|---|---|---|
| Solution A (supernatant) | $2.0 \times 10^{-8}$ | $1.93 \times 10^{-8}$ (total) | $2.0 \times 10^{-8}$ | $3.11 \times 10^{-8}$ (total) |
| Solution A (NCs isolated) |  | $6.59 \times 10^{-10}$ |  | $1.20 \times 10^{-6}$ |
| Solution B (supernatant) | $2.0 \times 10^{-8}$ | $19.2 \times 10^{-8}$ (total) | $2.0 \times 10^{-8}$ | $3.66 \times 10^{-8}$ (total) |
| Solution B (NCs isolated) |  | $5.80 \times 10^{-10}$ |  | $1.40 \times 10^{-6}$ |

The % of Ni was 96.7% in solution A (supernatant) and was 97.1% in solution B (supernatant).
The % of Cd was 97.5% in solution A (NCs isolated) and was 97.5% in solution B (NCs isolated).

Determination of DHLA Dissociation from CdSe NCs.

A 10.6 μM CdSe-DHLA NC(520) solution in 1:1 EtOH/$H_2O$ (10.0 mL) was kept in the dark under $N_2$ for 5 hours. The solution was then centrifuged at ~3000 rpm for 10 min to remove the precipitated NCs and this process was repeated. UV-vis spectra of this clear solution indicated that the total amount of leftover NCs was less than $7.0 \times 10^{-11}$ mol. The solution was then dried under vacuum and the solid was re-dissolved in 0.8 mL DMSO-$d_6$ containing $5.9 \times 10^{-7}$ mol benzene as internal standard. The $^1H$ NMR spectrum was recorded on a Bruker Avance 400 MHz spectrometer. The concentration of the DHLA was calculated to be in the range from $8.5 \times 10^{-7}$ mol to $1.5 \times 10^{-6}$ mol based on peak integrations with respect to benzene.

Cyclic Voltammetry.

Cyclic Voltammetry (CV) measurements of the Ni-DHLA complex were performed with a CH potentiostat using a one-compartment cell with a glassy carbon working electrode, Pt auxiliary electrode, and SCE reference electrode. The electrolyte for electrochemistry in 1:1 EtOH/$H_2O$ was 0.1 M potassium nitrate. Argon was used to purge all samples.

Acid Concentration Dependence Study.

A 0.50 M stock solution of trifluoroacetic acid was prepared in a $H_2O$ solution of 0.1 M $KNO_3$. A 5 mL solution containing 0.4 mM $Ni(NO_3)_2$ and 1.2 mM DHLA was stirred under argon for one hour. 8 μL acid stock (0.8 mM aliquots) solution was added to the Ni-DHLA solution and purged with argon for another 300 s before performing cyclic voltammetry.

Beer's Law by UV-Vis Absorption Spectra.

A stock solution was prepared by mixing equal volumes of 4.0 mM $Ni(NO_3)_2$ solution (with 0.4 M acetic acid/acetate as buffer in $H_2O$ at pH 4.5) and a 4.0 mM DHLA solution (in EtOH). The mixture was stirred for one hour to allow the formation of the red color Ni-DHLA complex in situ. This solution was diluted to specific concentration (from $1.0 \times 10^{-4}$ M to $5.0 \times 10^{-6}$ M) with 0.2 M acetic acid/acetate buffer solution at the same pH and UV-vis absorption spectra of the solutions were obtained on a Cary 60 spectrometer.

Job Plot by UV-Vis Absorption Spectra.

All solutions were prepared in 0.2 M acetic acid/acetate buffer solution (pH=4.5 in $H_2O$) in 1:1 EtOH/$H_2O$. A series of solutions for UV-vis measurements were prepared by mixing a solution containing $2.0 \times 10^{-4}$ M $Ni(NO_3)_2$ and a solution containing $2.0 \times 10^{-4}$ M DHLA solution in specific ratio (from 1:8 to 8:1; 3.0 mL total). These solutions were stirred under $N_2$ for 6 hours to allow the formation of Ni-DHLA before spectra were taken. The UV-vis absorption spectra of the solutions were obtained on a Cary 60 spectrometer.

6.2. Example 2: Integrated Nanotechnological Systems

This example describes integrated nanotechnological systems and integrated nanotechnological systems and biological systems for solar hydrogen production.

The CdSe QD-based $H_2$ production system has several issues. First, while the QY is very high for LED excitation at 520 nm, a good fraction of the solar spectrum is not absorbed by the QDs, thus reducing the overall efficiency of the system with respect to use of sunlight as a source of electromagnetic radiation by at least a factor of 4. A second problem is that since water oxidation is not occurring, a source of reducing electrons must be used to fill the photo-excited hole on the QDs, and this source is consumed during $H_2$ production. In fact, it has been shown that a limitation on the amount of $H_2$ produced is depletion of the sacrificial donor ascorbic acid (AA). Both of these limitations can be addressed as set out in the following example.

Figure 22:
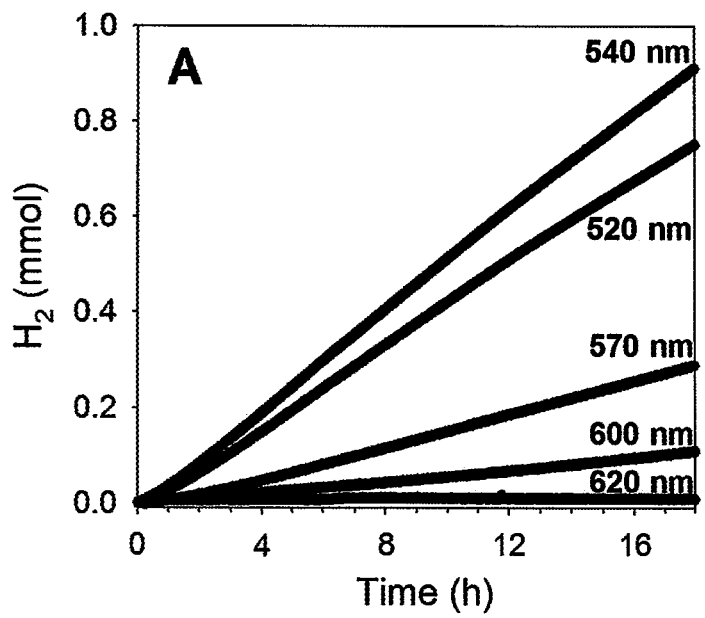

A reported photon-to-hydrogen conversion efficiency of 38% in water was calculated for excitation at nominally a single wavelength (i.e., at 520 nm) from a light emitting diode (LED) source. However, these CdSe QDs absorb in the visible region of the electromagnetic spectrum, and thus much of the solar spectrum is not absorbed. In a "real-world" context, it can be estimated that under conditions of solar exposure on the surface of the Earth (i.e., Air Mass (AM) 1.5 solar exposure) the QY would drop to around 10%. Making the QDs larger is one possible solution, since their bandgap shifts to the red and thus more of the solar spectrum is absorbed. However, using this approach can yield diminishing returns as for larger QDs the hydrogen production QY drops, likely due to a reduced overpotential for delivery of the electron (FIG. 22). Thus, alternative approaches can be considered.

First, QDs that absorb in the near infrared (NIR), in combination with the CdSe QDs, can be used to extend the spectral range of light absorption and thus increase overall system efficiency under realistic solar illumination conditions (AM 1.5). The efficiency will increase from absorbing more of the solar spectrum; light not absorbed by the CdSe QDs would be absorbed by NIR QDs creating the opportunity for more $H_2$ production from nominally the same solar flux. Specifically, in combination with the CdSe QDs in the above system, addition of CdTe, PbS or PbSe QDs can be used and $H_2$ production efficiency evaluated in the presence of Ni(II) salts, DHLA, and AA in water. Although the NIR absorbing QDs have a smaller bandgap than CdSe QDs, their conduction bands (depending on QD size) can be made to have a potential that is more reducing than that of the largest CdSe QDs. Thus, these NIR absorbing QDs afford the possibility to extend the wavelength response of the system with minimal drop in QY. Since AA, DHLA and Ni(II) salts compose the basis of an efficient $H_2$ production system, this approach can be used as the only major variable in this approach is the reduction potential of the photoexcited electron in the NIR QD.

CdTe QDs can be synthesized with reduction potentials similar to CdSe QDs, i.e., reduction potentials more negative than −1.0 V versus NHE. Electrocatalysis experiments showed a cathodic feature for the Ni-DHLA catalyst at −0.9 V versus NHE, indicating that Ni-DHLA catalyst can reduce protons catalytically at this potential, and it is expected that CdSe and CdTe QDs can deliver electrons with greater than a 100 mV overpotential. Furthermore, CdTe QDs are particularly attractive in that they can extend the spectral absorption of the system to past 850 nm, which would double the overall efficiency of the system under AM 1.5 solar illumination.

Figure 23:
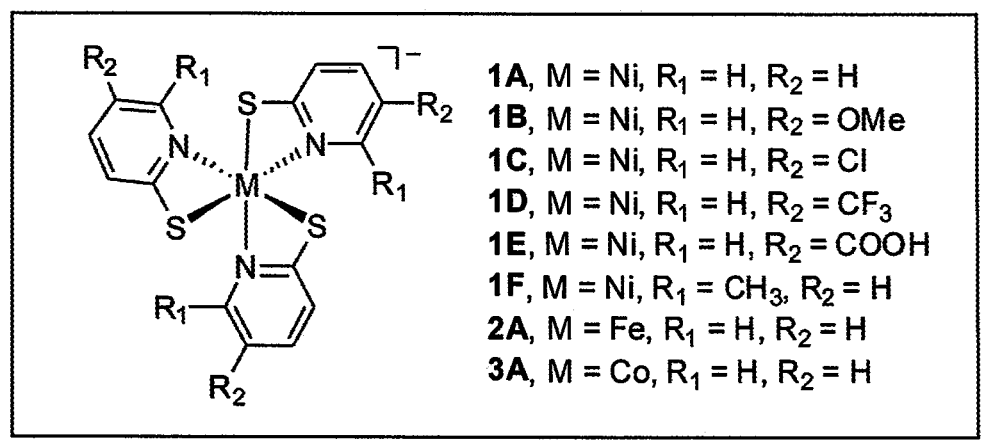

Photocatalytic $H_2$ production experiments can be performed using CdTe QDs capped by DHLA in the presence of AA and Ni(II) salts in water. CdTe QDs can be synthesized according to the general methods of Peng and Peng and the organic surface capping molecule can be replaced with DHLA. Photogeneration of $H_2$ can be carried out as described herein. Briefly, varying amounts of Ni(II), CdTe-DHLA QDs and AA in $H_2O$ can be added together to obtain a total volume of 5.0 mL. The pH of this solution can be adjusted by adding HCl or NaOH and measured with a pH meter. Samples can be placed into a temperature-controlled block at 15° C. and sealed with an air-tight cap fitted with a pressure transducer and a septum. To measure the amount of hydrogen gas produced, samples can be degassed with 4:1 $N_2/CH_4$ atmosphere (1 atm), and the $H_2$ peak will be measured using gas chromatography (GC) relative to that of $CH_4$ which is used as an internal reference. Cells can be irradiated using an AM 1.5 solar simulator (Newport Corporation). $H_2$ production can be optimized with respect to pH, concentration of Ni ions, concentration of CdTe QDs, and diameter of the CdTe QDs. The photocatalytic performance of simple Ni(II) salts can be compared to other non-precious metal catalysts (Ni, Fe, and Co) (see FIG. 23 for examples). Finally, the type of sacrificial donor can also be varied including AA, amines (e.g., triethylamine, triethanolamine, diisopropylethylamine), and alcohols (e.g., ethanol).

Of particular interest is the dependence of the catalytic activity on the diameter of the CdTe QD. For a given catalyst, changing the QD diameter changes the potential of the conduction band and thus changes the potential of the reducing electron as delivered to the catalyst. Thus, this measurement provides insight into the dependence of catalytic activity on the reducing potential of the electron. Interestingly, with CdSe QDs the reducing potential of the conduction band electron had a strong effect on the $H_2$ production rate and efficiency (FIG. 22). Changing the chemical nature of the catalyst also can affect the overpotential. For example, addition of chemical groups that incorporate proton relays can substantially lower overpotentials for $H_2$ production. Thus, it is expected that a combination of catalyst (i.e., FIG. 23) and QD diameter will produce the largest QY.

Once $H_2$ production with CdTe QDs is optimized, two general approaches can be used to maximize the overall QY for $H_2$ production. Initially one can use a single solution containing the CdSe and CdTe QDs, sacrificial donor (AA) and catalysts. The advantage in this approach is simplicity of design. However, it is possible that optimal $H_2$ production conditions and catalysts for CdSe QDs may not be optimal for CdTe QDs. Furthermore, in the same solution light absorption by each QD species may not be optimized either. Thus we can use an approach in which CdSe and CdTe QDs are in separate cells, with CdSe first and CdTe QDs second. Light passing through the CdSe cell is absorbed by the CdTe QDs. This slightly more complicated system may produce significantly larger QYs since total solar light absorption can be maximized and different catalysts and conditions can be used in each cell.

Even with CdTe QDs as part of the overall system, only slightly more than 50% of the available solar flux would be absorbed. Further increases in QY can be obtained, however, by incorporating materials with smaller energy gaps than CdTe but with relatively reducing excited state energies. For example, PbS and PbSe QDs with diameters <4 nm have reduction potentials more negative than −0.5 V and thus have the potential to reduce protons near and below neutral pH, and would extend the spectral responsivity beyond 1400 nm. Tuning the size of the QDs, especially in the case of the lead chalcogenides, can be used to determine how much overpotential is required to drive the proton reduction. For example, PbSe QDs 3-nm in diameter have a conduction band reduction potential of more negative than −0.75 V while absorbing light out to 1100 nm. Furthermore, these NIR-absorbing QDs have longer excited-state lifetimes than CdSe, approaching 1 microsecond for the Pb-chalcogenide QDs, which can also lead to greater catalytic efficiency. Finally, PbSe QDs have been reported to deliver hot electrons on ultrafast timescales (sub 50 fs) to an acceptor ($TiO_2$), thus possibly affording electron transfer to a catalyst with a reduction potential in large excess of the conduction band reduction potential. Photocatalytic production of $H_2$ using PbS and PbSe QDs can be conducted using the same general approach as for the CdSe and CdTe QDs. To effectively and meaningfully compare performance of II-VI versus IV-VI QD materials with respect to $H_2$ production efficiency and longevity, QDs with similar bandgaps must be synthesized. To that end, ultra-small PbS and PbSe QDs with bandgaps in the red can be synthesized. The smallest of these QDs ultra-small QDs have bandgaps in the visible (i.e., around 575 to 650 nm) can allow direct comparison of CdSe, CdTe, PbSe and PbS QDs and thus provide insight into the effect of conduction band overpotential and surface chemistry on catalytic performance.

Finally, photocatalytic $H_2$ production experiments using ZnS, ZnSe, core-shell CdSe/ZnS and CdZnS QDs, and alloyed ZnSSe QDs, which do not contain toxic heavy metals, can be performed. ZnS and ZnSe QDs absorb in the green and blue portions of the solar spectrum and thus some sizable portion of the solar spectrum will not be absorbed, reducing overall efficiency. Efficient $H_2$ production with green absorbing CdSe QDs has been demonstrated, the potential widespread use of heavy metals naturally leads to sustainability questions related to toxicity and disposal. ZnS and ZnSe QDs do not raise these same environmental concerns, and the toxicity of ZnS-capped CdSe QDs is significantly less than the bare CdS QDs, but their $H_2$ production characteristics are unknown. Second, with regards to replacing the AA with electrons from bacteria, cytotoxicity could be an issue that limits the utility of this approach, so in one embodiment, the $H_2$ production performance of the Zn-based chalcogenide QDs is benchmarked CdSe and InAs QDs can be doped with non-isovalent metal ions, producing charged nanocrystals. Interestingly, in the case of CdSe QDs doped with $Ag^+$, new photoluminescence bands appear to the red of the main excitonic (PL) peak, indicating new electronic states nominally located energetically in the QD bandgap (FIG. 22). These "dopant" states can have extremely long PL lifetimes compared to band-edge excitonic transitions, which can lead to improved QYs for $H_2$ production due to the higher probability of interaction between a photoexcited QD and a catalyst. Furthermore, n-type QDs that are doped with silver ions have several extra electrons in the QD available to perform photochemistry.

Figure 24:
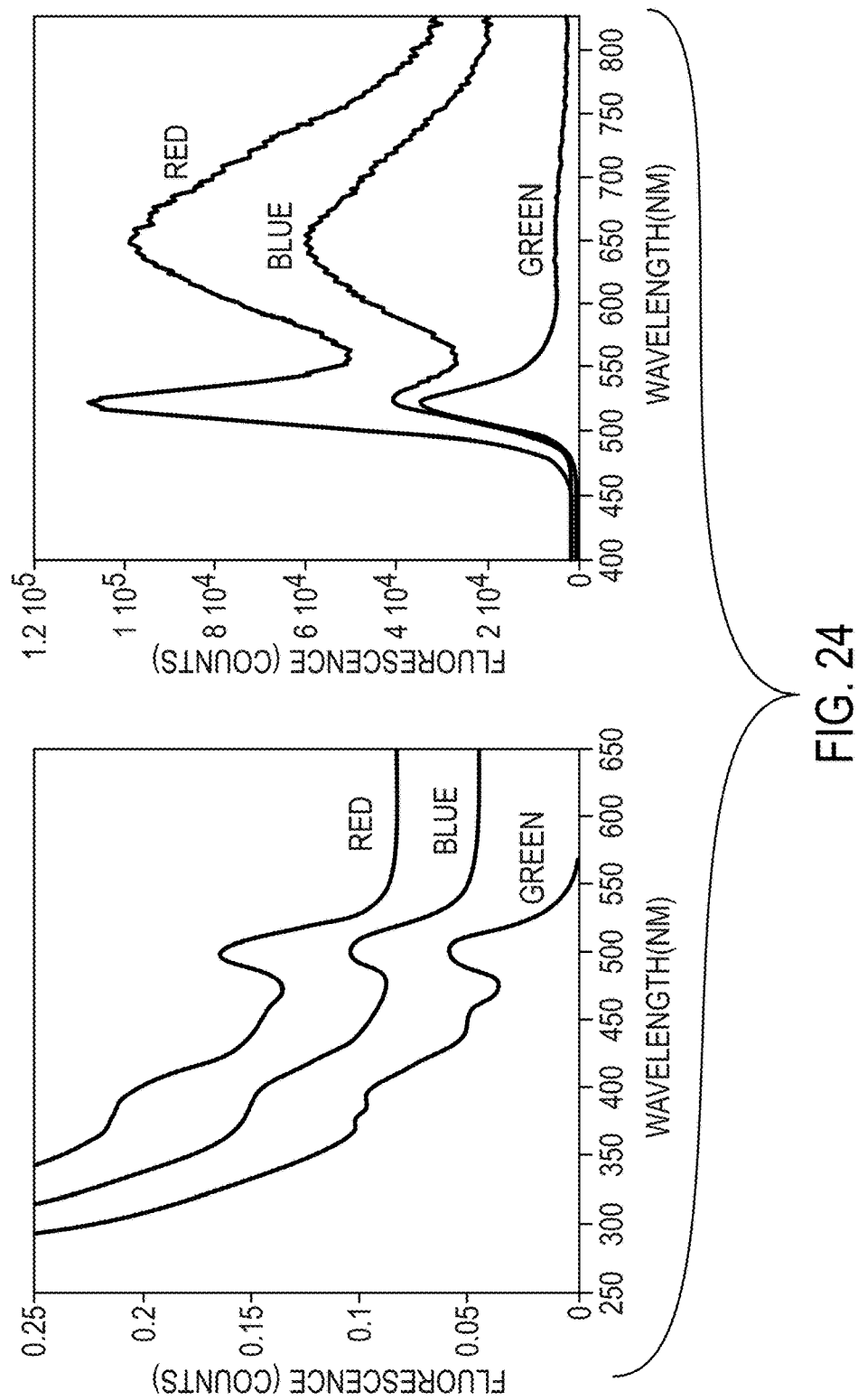

Initially, CdSe QDs doped with $Al^{3+}$ or $Ag^+$ ions can be synthesized (FIG. 24). Doped QD samples can be characterized with absorption spectroscopy and photoluminescence spectroscopy, as the incorporation of dopants leads to additional electronic levels in the QD energy gap (FIG. 24). The amount of dopant impurities can be characterized by inductively coupled plasma mass spectroscopy (ICP-MS). Size and shape can be characterized by transmission electron microscopy (TEM). Time resolved photoluminescence can be used to understand the lifetime of the dopant PL band, since lifetime of dopant state is not known, and this lifetime directly relates to the efficiency the charge transfer; long lifetimes are desired for efficient charge transfer. To directly compare the effects of QD doping, $H_2$ production can be measured under identical conditions for doped and undoped QDs: we can place QDs in water with DHLA, Ni(II) salts, and AA as a sacrificial donor. $H_2$ production will be characterized for different QD diameters (thus changing overpotential) and for different numbers of dopant atoms. Interestingly, the number of Ag dopant atoms per QD was shown to have a large effect on the doping charge of the QD: small numbers of Ag per QD (1-2) produced p-type QDs while larger numbers of dopants (8-10) per QD produced n-type QDs. We can to explore $H_2$ production for both cases.

Figure 25:
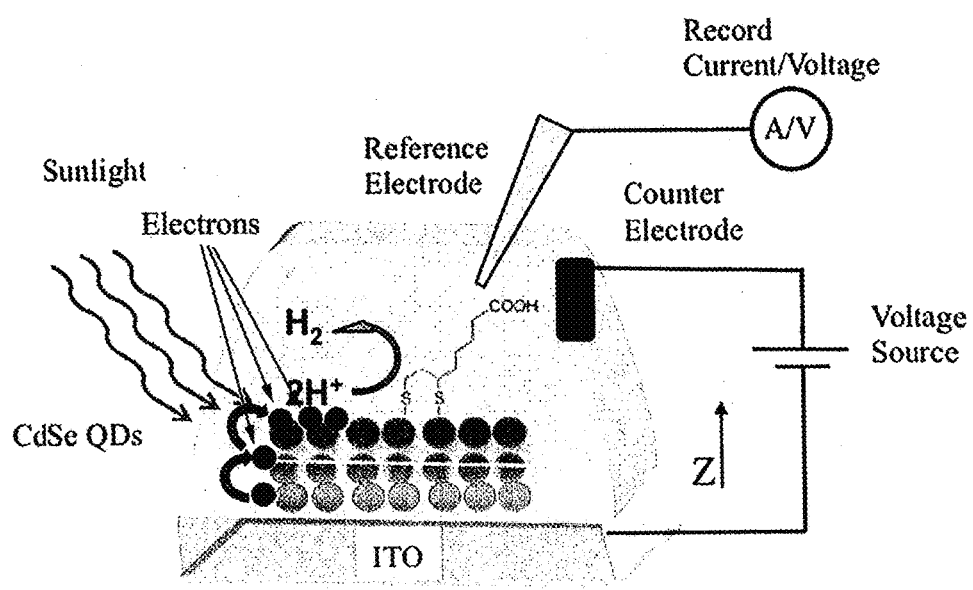

In another embodiment, $H_2$ is produced through heterogeneous catalysis with the goal of replacing the sacrificial donor with electrons obtained from an external circuit. Specifically, $H_2$ photoelectrocatalytically can be generated through placing QDs on a transparent electrode such as indium tin oxide (ITO), similar to $H_2$ production studies of InAs QDs on Au electrodes. CdSe QD films can be cast on to ITO or zinc oxide substrates and placed under an applied bias through electrochemical control. The Ni salts and DHLA can be added to the electrolytic solution and the electrochemical cell will be sealed (FIG. 25). It is expected that under an appropriate bias the ITO and ZnO substrates will reduce the photoexcited QD, as they have been used for some time in ensemble and single molecule spectroelectrochemistry studies of CdSe QDs. $H_2$ production will be characterized as has been previously reported. Of importance will be the $H_2$ production rate, turnover number (TON), and QY with respect to the thickness of the QD film and the diameters of the QDs. In particular, we can explore fabrication of QD films containing both uniform and different sized QDs, with the smaller diameter QDs closer to the electrode and the larger diameter QDs touching the electrolyte. In this configuration electrons will flow energetically "downhill" toward the catalyst, "piling up" in the topmost layer, which may lead to greater catalytic efficiency, although it is recognized there may be a tradeoff with reduced overpotential in the larger QDs. Various strategies well-known to enhance QD film conductivity for photovoltaic applications can be applied to facilitate electron transfer between QDs. For example, assembled QD films can be treated with ethanedithiol or hydrazine, which reduces the distance between QDs, and thus decreases film resistance by orders of magnitude.

Integrated Quantum Dot Biological Hybrid Systems. A significant barrier to sustainable photochemical water splitting is the water oxidation reaction. This four-electron reaction is driven at highly oxidizing potentials and as a result most sunlight-absorbing materials (such as crystalline semiconductors) and catalysts that in a practical system need to be stable over many turnovers are degraded after only a short time. A solution is to bypass the problematic water oxidation reaction completely. However, as detailed above in this example, these schemes typically involve a sacrificial donor molecule of some kind and thus are have sustainability related issues since the donor must be periodically replenished, providing a materials and energy cost.

Electrogenic bacteria, such as Shewanella species, that engage in extracellular electron transfer (EET) in the course of their metabolism can be used as a source of electrons. By using bacteria to provide electrons to the QDs, electron input is available to the system as long as the bacteria have nutrients available for growth. This approach represents a new application of bacteria and EET in fuel production.

Another biology-based approach to energy conversion that can be used is to make use of biological molecules or microbes in bioelectrochemical systems (BECs) in which bacteria interact with electrodes to donate or accept electrons. In most configurations, electrons are transferred from the bacterium to the anode, which can occur through a membrane-associated electron-transfer protein or a soluble electron shuttle. Electron shuttles may be excreted by the bacterium, or added to the system. A number of different electron acceptors can typically be used by an electrogenic bacterium, and thus the bacteria are compatible with a range of cell designs and anode materials. The most common type of BEC is the microbial fuel cell (MFC), in which electricity is generated from bacterial electron donors to the anode, driving a current (FIG. 26A). Thus, the chemical energy in the nutrients metabolized by the bacteria is converted to electrical energy. MFCs have long lifetimes (e.g., up to five years), but suffer from low power densities. Furthermore, the cathodic $O_2$ reduction reaction is considered to be a major performance bottleneck. Replacing $O_2$ reduction with $H^+$ reduction leads to an alternative class of BEC, the microbial electrolysis cell (MEC), in which microbes supply electrons to the anode, and a fuel such as $H_2$ is evolved at the cathode, which is typically Pt (FIG. 26B). A supplemental voltage must be applied to overcome the bather for $H_2$ formation. A benefit of the BEC is that energy is converted into a storable form. A related technology is the light-driven bioelectrochemical system that uses photosynthetic organisms or photosystems to drive a current. For example, photosystem II oxidizes water to $O_2$ and provides electrons to the anode, and $O_2$ is reduced back to $H_2O$ by the enzyme bilirubin oxidase at the cathode, driving current. A related photo-BEC uses a Cu nanowire photoanode and a Shewanella-based bioanode.

Figure 27:
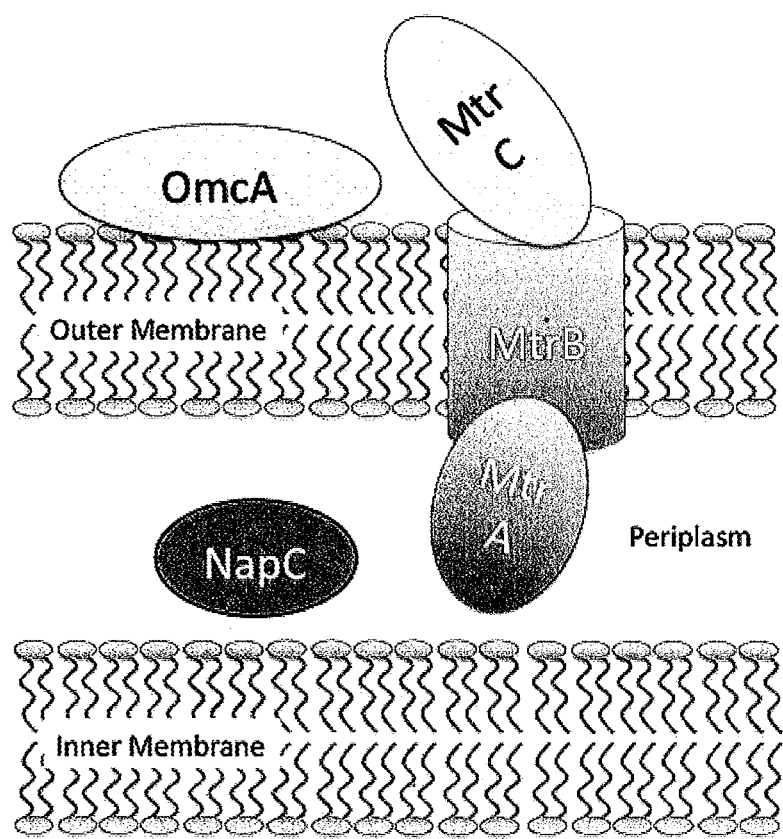

Electrogenic bacteria typically make use of multiheme electron transfer proteins in the cytochrome (cyt) c family in extracellular electron transfer (FIG. 27). For example, in S. oneidensis MR-1, 42 cyts c are known and 80% of these locate in the outer membrane, covering 8-34% of the cell surface. The terminal protein in these pathways is typically a multiheme outer membrane cytochrome (OMC), which serves as a conduit to an extracellular terminal electron acceptor such as a metal ion or solid metal oxide. The pathway is quite well-understood in S. oneidensis, the components of which are shown in FIG. 27. Electrons produced from metabolizing nutrients are transferred to in innermembrane tetraheme cytochrome CymA (NapC is an E. coli ortholog), and then to a soluble periplasmic decaheme cytochrome MtrA, which delivers electrons to decaheme OMCs OmcA and MtrC. Notably, Shewanella MtrC, MtrA, and MtrB have been expressed in E. coli and shown to mediate EET to solid metal oxides in the engineered E. coli known as E. coli-MTR, supporting work disclosed here to utilize engineered bacteria.

Approach.

A hybrid $H_2$-generating system is built making use of the high efficiency of light-driven $H_2$ generation by robust QDs and Ni salts (described above) and the ability of naturally-occurring or engineered bacteria to convert nutrients into reducing electrons that are pumped outside of the cell. Functionally, such assemblies resemble $H_2$-producing bioelectrolysis cells. However, by utilizing the photochemical properties of quantum dots, $H_2$ production can be driven without the need for applying an external voltage as is needed in bioelectrolysis.

*Shewanella oneidensis* MR-1, a Gram-negative freshwater dissimilatory metal-reducing bacterium that engages in EET, can be used for this purpose. *Shewanella* can survive and proliferate in both aerobic and anaerobic environments, can form biofilms, and is a popular organism to use in BECs. In addition, we can utilize the workhorse bacterium *Escherichia coli* engineered to overexpress *S. oneidensis* cytochromes in the EET pathway including the cytochromes MtrA, MtrC, and OmcA, as well as the porin protein MtrB. The expression and appropriate cellular localization of these proteins in *E. coli* has been reported. The advantage of using *E. coli* is that its well-understood genetics allow facile manipulation of the Mtr genes to optimize the system and to understand the roles of the Mtr proteins in the function of the system. The cytochromes to be used have multiple heme groups, allowing them to store and transfer multiple electrons, and they have relatively low reduction potentials, in the range of −100 to −360 mV versus NHE. Other multiheme cytochromes including some with yet lower potentials are known and may be expressed as well. These low-potential cytochromes are thermodynamically capable of delivering electrons to oxidized QDs, as their potentials are lower than donors used successfully. Both *E. coli*-MTR and *S. oneidensis* are capable of transferring electrons directly to metal oxides and nanoparticles. Finally, Gram-positive bacteria such as engineered *Bacillus subtilis* can be used as electron donors. *B. subtilis* is a hardy bacterium already widely used for protein expression in industrial settings. Using *B. subtilis* will require expression of OMCs in this bacterium. As needed, delivery of electrons from bacteria to QDs may be assisted by a small-molecule mediator of appropriate redox potential.

Nano-Bio $H_2$-Evolving Assembly Designs.

Three distinct assemblies can be used.

Figure 28:
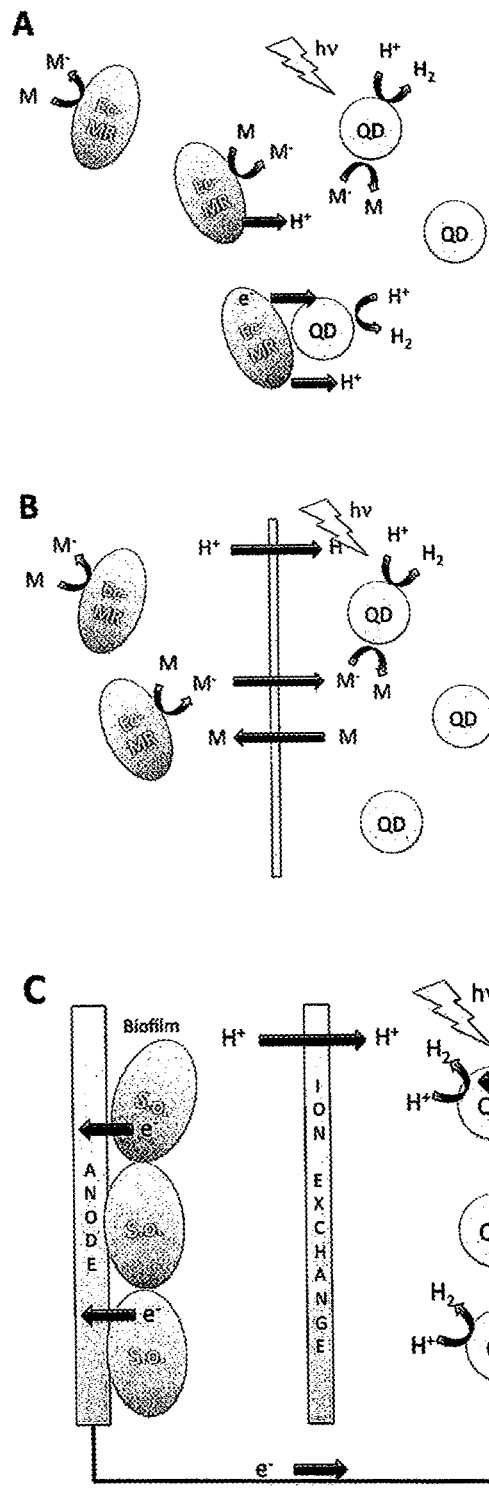

The first approach is direct combination of QDs and bacteria in solution (FIG. 28A). This system is in analogy to an approach of utilizing CdSe quantum dots, a Ni(II) catalyst, and ascorbate as an electron donor. In this system, the sacrificial electron donor is replaced by electrogenic bacteria, and the system is run in an appropriate bacterial medium. As bacteria respire, they engage in EET and also release cations including protons. The electrons and protons are then available for $H_2$ production driven by the QD:Ni(II) photocatalysis system. This assembly can be constructed with and without soluble redox mediators. Because electrogenic bacteria typically donate electrons directly to solid metals, and have been shown to donate electrons to nanoparticles, direct electron transfer from bacteria to QDs is expected. The electrons produced by electrogenic bacteria are expected to have sufficient reducing power to serve as donors to oxidized QDs. Indeed, typical reduction potentials of OMCs (~−0.3 V) are significantly lower than that of ascorbate (~0.06 V). A number of bacterial strains may be used in this assembly including *S. oneidensis* MR-1, which is frequently used in biofuel cells and has well-understood EET function, and engineered *E. coli*-MTR, expressing EET-mediating proteins of *S. oneidensis* MR-1.

Figure 29:
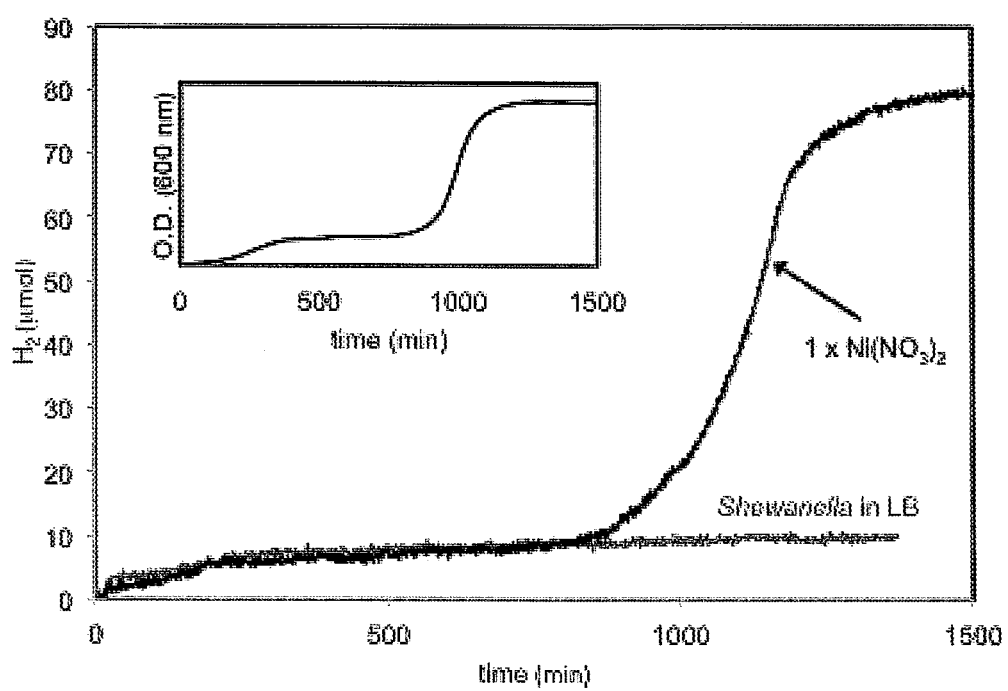

An example of this system functioning is shown in FIG. 29.

In addition, Gram-positive dissimilatory metal-reducing bacteria can be used. Such bacteria are attractive microbes because of their resistance to QD-mediated toxicity (see below). An example is the recently discovered *Thermincola potens*, which undergoes EET via OMCs. It is expected that *B. subtilis* can be engineered to express the *T. potens* EET-mediating proteins. An advantage of using *B. subtilis* is that it already shows wide use for protein expression not only in research laboratories but also for a range of industrial applications, and is capable of excreting recombinant proteins.

The second approach that can be used is separating the electrogenic bacteria and QDs by a porous membrane (FIG. 28B) that allows the passage of small molecules and ions but not bacteria and QDs. In this scheme, QDs and bacteria do not come into direct contact with each other. Charge is transferred using a small-molecule mediator added to the system; some bacteria such as *Shewanella* or *Bacillus* also excrete mediators such as flavins. The advantage of this approach is that any damage to bacteria that may result from direct contact with QDs will be mitigated, although the cost may be lower efficiency owing to the use of electron mediators. Nevertheless, small-molecule electron shuttles are routinely used in MFCs and MECs with success, although a direct electron-transfer approach can be used when feasible.

The third approach is to construct a photo-bioelectrochemical cell (FIG. 28C) in which electrogenic bacteria deliver electrons to the anode, and QDs and Ni(II) receive electrons from the cathode to catalyze $H_2$ evolution. This particular approach is directly related to the previously mentioned heterocatalytic study involving photochemical $H_2$ production by replacing the sacrificial donor with electrons obtained from an external circuit. In this case, electrons are generated in situ from the bacteria, as opposed to coming external to the system such as from an applied potential. Irradiation of the QDs, putting them into the excited state, provides sufficient energy needed to drive the reaction, as has already been established. The QDs and bacteria can be separated by a cation-exchange membrane; Nafion™ is commonly used in BECs. This setup parallels that of MECs, except that no external voltage need be applied, because the needed energy is supplied photochemically. An advantage of this system is that the separation of the QDs and bacteria mitigates concerns about QD toxicity. Furthermore, biofilm-forming bacteria can be grown directly on the anode for direct electron transfer, which increases efficiency relative to use of mediators.

Mitigating QD Toxicity to Bacteria.

In a system combining QDs and bacteria QD toxicity may adversely affect bacterial growth. While QD toxicity mechanisms are not fully understood, there is significant evidence that creation of reactive oxygen species (ROS) is the main toxicity causing mechanism. Release of toxic metals such as $Cd^{2+}$ is also a concern, although there is significant evidence that free $Cd^{2+}$ released from Cd-containing QDs is typically present at subtoxic levels to most bacteria. Furthermore, QD toxicity has been shown to depend greatly on QD composition, size, and capping ligand, suggesting that there is significant room for selection of desirable QD features. Such toxicity may be a concern with the assembly in FIG. 28A, in which QDs and bacteria have direct contact. The other assemblies provide increasing amounts of separation between QDs and bacteria. Data shown in FIG. 29 demonstrate the growth of *Shewanella oneidensis* in the presence of CdSe QDs, indicating that toxicity does not prevent function in this example.

The following approaches can be used to address this problem:

1) ROS scavengers can be used.
2) Biocompatible QDs such as ZnSe- or ZnS-based QDs can be used.
3) ROS detoxification enzymes including superoxide dismutase and catalase in *E. coli*-MTR and *B. subtilis* can be overexpressed. Furthermore, expressing proteins such as bacterial metallothioneins that mediate heavy-metal toxicity may protect against Cd toxicity.
4) The QDs can be coated with organic coatings that ameliorate toxic effects, while allowing for catalytic activity. Combinations of capping ligands can be used.
5) Gram-positive bacteria, which are less sensitive to CdTe dots upon irradiation, can be used.
6) Devices that physically separate the bacteria and QDs (FIGS. 28B and C) can be used. Such devices avoid direct contact between QDs and bacteria and minimize toxicity. However, quenching and mitigation of ROS may be used in cases where the bacterial and QD components are connected by a membrane.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

While embodiments of the present disclosure have been particularly shown and described with reference to certain examples and features, it will be understood by one skilled in the art that various changes in detail may be effected therein without departing from the spirit and scope of the present disclosure as defined by claims that can be supported by the written description and drawings. Further, where exemplary embodiments are described with reference to a certain number of elements it will be understood that the exemplary embodiments can be practiced utilizing either less than or more than the certain number of elements.

All references cited herein are incorporated herein by reference in their entirety and for all purposes to the same extent as if each individual publication, patent or patent application was specifically and individually indicated to be incorporated by reference in its entirety for all purposes.

The citation of any publication is for its disclosure prior to the filing date and should not be construed as an admission that the present invention is not entitled to antedate such publication by virtue of prior invention.

A sample of methods and compositions that are described herein are set forth in the following numbered paragraphs:

1. A method for producing hydrogen comprising:
(a) providing a source of electrons;
(b) contacting a nanoparticle or a plurality of nanoparticles and a metal complex catalyst in an aqueous medium to form a mixture in the presence of the source of electrons; and
(c) exposing the mixture from (b) to electromagnetic radiation having at least a wavelength in the absorption profile of the nanoparticle or the plurality of nanoparticles,
wherein:
upon exposure to the electromagnetic radiation, the nanoparticle or the plurality of nanoparticles is capable of generating an electron that can reduce, in the presence of the catalyst, a proton in the aqueous medium, and the source of electrons is capable of reducing the nanoparticle or the plurality of nanoparticles after reduction of the proton, such that hydrogen is produced.

2. The method of paragraph 1, wherein the plurality of nanoparticles comprises at least two different types of nanoparticles.

3. The method of paragraph 1, wherein the nanoparticle or plurality of nanoparticles is doped with a plurality of isovalent dopants and/or non-isovalent dopants.

4. The method of paragraph 1, wherein the source of electrons is a sacrificial electron donor and is present in the mixture.

5. The method paragraph 1, wherein the source of electrons is an external source of electrons.

6. The method of paragraph 5, wherein the external source of electrons is a solar cell or an electrochemical bias.

7. The method of paragraph 1, wherein the metal complex catalyst is generated in situ.

8. The method of paragraph 1, wherein the aqueous medium is water.

9. A composition for producing hydrogen comprising:
(a) a nanoparticle or a plurality of nanoparticles;
(b) a metal complex catalyst;
(c) a source of electrons; and
(d) an aqueous medium;
wherein:
the nanoparticle or the plurality of nanoparticles, the metal complex catalyst, and the aqueous medium are present as a mixture,
upon exposure to electromagnetic radiation having at least a wavelength in the absorption profile of the nanoparticle or the plurality of nanoparticles, the nanoparticle or the plurality of nanoparticles is capable of generating an electron that can reduce, in the presence of the metal complex catalyst, a proton in the aqueous medium, and
the source of electrons is capable of reducing the nanoparticle or the plurality of nanoparticles after reduction of the proton.

10. The composition of paragraph 9, wherein the plurality of nanoparticles comprises at least two different types of nanoparticles.

11. The composition of paragraph 9, wherein the nanoparticle is doped with a plurality of isovalent dopants and/or non-isovalent dopants.

12. The composition of paragraph 9, wherein the source of electrons is a sacrificial electron donor.

13. The composition of paragraph 9, wherein the source of electrons is present in the mixture.

14. The composition paragraph 9, wherein the source of electrons is an external source of electrons.

15. The composition of paragraph 14, wherein the external source of electrons is a solar cell or an electrochemical bias.

16. The composition of paragraph 9, wherein the nanoparticles are selected from the group consisting of CdSe, CdS, CdTe, PbS, PbTe, PbSe, GaAs, InP, InAs, Si, and Ge nanoparticles.

17. The composition of paragraph 9, wherein the nanoparticle is selected from the group consisting of nanocrystals, quantum dots (QDs), magic size clusters (MSCs), quantum rods, dot-in-rod nanocrystals, quantum wires, dendridic inorganic nanostructures, tetrapods, cubes, core-shell nanoparticles, and an alloy structure thereof.

18. The composition of paragraph 9, wherein the metal complex is a transition metal salt.

19. The composition of paragraph 18, wherein the transition metal salt is a $Ni^{2+}$ salt.

20. The composition of paragraph 9, wherein the aqueous medium is water.

What is claimed is:

1. A composition for producing hydrogen comprising:
   (a) a nanoparticle or a plurality of nanoparticles;
   (b) a metal complex catalyst;
   (c) an external source of electrons, wherein the external source of electrons is a biological system; and
   (d) an aqueous medium;
   wherein:
      the nanoparticle or the plurality of nanoparticles, the metal complex catalyst, and the aqueous medium are present as a mixture,
      upon exposure to electromagnetic radiation having at least a wavelength in the absorption profile of the nanoparticle or the plurality of nanoparticles, the nanoparticle or the plurality of nanoparticles is capable of generating an electron that can reduce, in the presence of the metal complex catalyst, a proton in the aqueous medium, and
      the source of electrons is capable of reducing the nanoparticle or the plurality of nanoparticles after reduction of the proton.

2. The composition of claim 1, wherein the plurality of nanoparticles comprises at least two different types of nanoparticles.

3. The composition of claim 1, wherein the nanoparticle or plurality of nanoparticles is doped with a plurality of isovalent dopants and/or non-isovalent dopants.

4. The composition of claim 1, wherein the source of electrons is present in the mixture.

5. The composition of claim 1, wherein the nanoparticle or plurality of nanoparticles are selected from the group consisting of CdSe, CdS, CdTe, PbS, PbTe, PbSe, GaAs, InP, InAs, Si, and Ge nanoparticles.

6. The composition of claim 1, wherein the nanoparticle is selected from the group consisting of nanocrystals, quantum dots (QDs), magic size clusters (MSCs), quantum rods, dot-in-rod nanocrystals, quantum wires, dendridic inorganic nanostructures, tetrapods, cubes, core-shell nanoparticles, and an alloy structure thereof.

7. The composition of claim 1, wherein the metal complex is a transition metal salt.

8. The composition of claim 7, wherein the transition metal salt is a Cr, Mn, Fe, Co, Ni, Cu, Mo, Ru, Rh, Pd, Ag, W, Os, Ir, Pt, or Au salt, or a mixture thereof.

9. The composition of claim 1, wherein the aqueous medium is water.

10. The composition of claim 1, wherein the biological system comprises bacteria and a nutrient source or growth medium for the bacteria.

11. The composition of claim 10, wherein the bacteria are the source for the nanoparticles.

12. The composition of claim 1, wherein the catalyst comprises an organic ligand.

* * * * *